AUTOMATIC PICTURE TAKING AND FINISHING APPARATUS

Filed Aug. 8, 1946

12 Sheets-Sheet 1

Inventors:
WILLIAM RABKIN
ALEXANDER LISSIANSKY
and ANDREW SEBESTYEN

By

Edwin Leisohn

Attorney

AUTOMATIC PICTURE TAKING AND FINISHING APPARATUS

Filed Aug. 8, 1946 12 Sheets-Sheet 2

Inventors
WILLIAM RABKIN
ALEXANDER LISSIANSKY
and ANDREW SEBESTYEN
By
Edwin Leisohn
Attorney

AUTOMATIC PICTURE TAKING AND FINISHING APPARATUS

Filed Aug. 8, 1946 12 Sheets-Sheet 3

Inventors
WILLIAM RABKIN
ALEXANDER LISSIANSKY
and ANDREW SEBESTYEN
by Edwin Leinske
Attorney Inventors
WILLIAM RABKIN
ALEXANDER LISSIANSKY
and ANDREW SEBESTYEN
by Edwin Leisohn
Attorney Dec. 5, 1950 W. RABKIN ET AL 2,532,855

AUTOMATIC PICTURE TAKING AND FINISHING APPARATUS

Filed Aug. 8, 1946 12 Sheets-Sheet 5

Inventors
WILLIAM RABKIN
ALEXANDER LISSIANSKY
and ANDREW SEBESTYEN by Edwin Leisohn Attorney Dec. 5, 1950 W. RABKIN ET AL 2,532,855

AUTOMATIC PICTURE TAKING AND FINISHING APPARATUS

Filed Aug. 8, 1946 12 Sheets-Sheet 6

Inventors
WILLIAM RABKIN
ALEXANDER LISSIANSKY
and ANDREW SEBESTYEN

By Edwin Leisoher

Attorney

AUTOMATIC PICTURE TAKING AND FINISHING APPARATUS
Filed Aug. 8, 1946 12 Sheets-Sheet 7
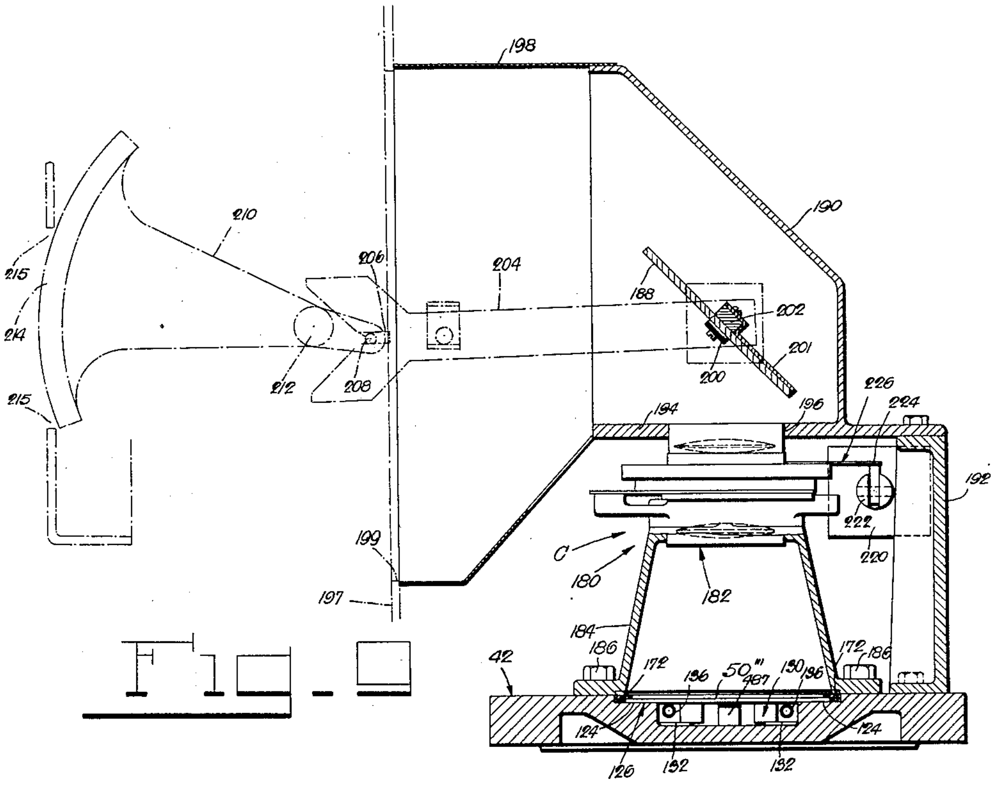
FIG. 9
FIG. 20
FIG. 21
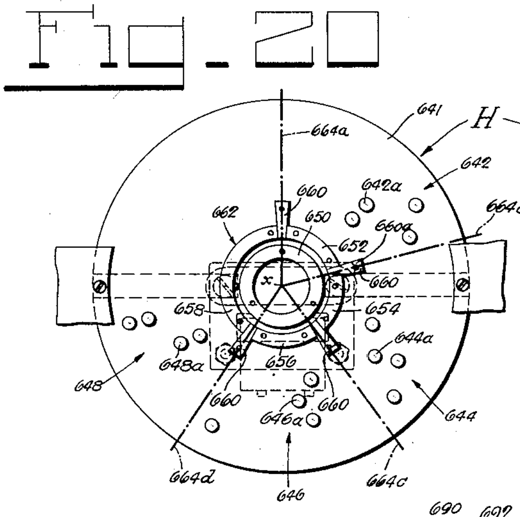
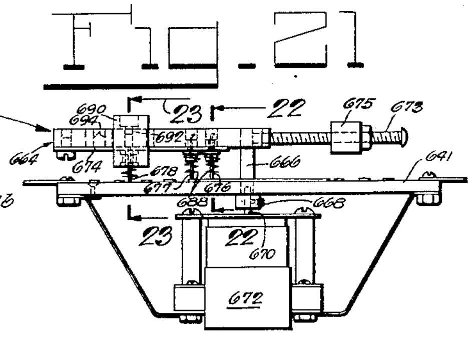
FIG. 23
FIG. 22
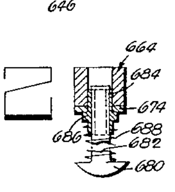
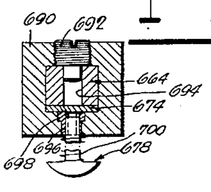
Inventors
WILLIAM RABKIN
ALEXANDER LISSIANSKY
and ANDREW SEBESTYEN
by Edwin Leinstein
Attorney Inventors
WILLIAM RABKIN
ALEXANDER LISSIANSKY
and ANDREW SEBESTYEN
By Edwin Leinsohn
Attorney Dec. 5, 1950 W. RABKIN ET AL 2,532,855

AUTOMATIC PICTURE TAKING AND FINISHING APPARATUS

Filed Aug. 8, 1946 12 Sheets-Sheet 9

Inventors
WILLIAM RABKIN
ALEXANDER LISSIANSKY
and ANDREW SEBESTYEN

By Edwin Leisohn

Attorney

AUTOMATIC PICTURE TAKING AND FINISHING APPARATUS

Inventors
WILLIAM RABKIN
ALEXANDER LISSIANSKY
and ANDREW SEBESTYEN
by Edwin Leisohn
Attorney Inventors
WILLIAM RABKIN
ALEXANDER LISSIANSKY
and ANDREW SEBESTYEN
By Edwin Leinsohn
Attorney

AUTOMATIC PICTURE TAKING AND FINISHING APPARATUS

Filed Aug. 8, 1946 12 Sheets-Sheet 12

Inventors
WILLIAM RABKIN
ALEXANDER LISSIANSKY
and ANDREW SEBESTYEN
By
Edwin Leisohn
Attorney Patented Dec. 5, 1950

2,532,855

UNITED STATES PATENT OFFICE 2,532,855

AUTOMATIC PICTURE-TAKING AND FINISHING APPARATUS

William Rabkin, Alexander Lissiansky, and Andrew Sebestyen, New York, N. Y., assignors to International Mutoscope Corporation, Long Island City, N. Y., a corporation Application August 8, 1946, Serial No. 689,178

17 Claims. (Cl. 95—14)

This invention relates to automatic photographic machines or apparatus, and more particularly to automatic apparatus of the type by which photographs may be taken and developed, and finished positives delivered within a short time.

Apparatus of this general type is shown and described in the patent to Rabkin et al., No. 2,192,755, dated March 5, 1940. The photographic process carried out in this prior apparatus is known as the re-exposure or re-development process, according to which a positive picture is produced directly on a sensitized plate after the same is exposed. To this end, the prior apparatus is provided with an interchangeable magazine holding a supply of sensitized plates which are successively transferred, as they are needed for photographs, from the magazine to a station at which they are exposed, and then to a station at which they are developed and re-developed and from which they are delivered as finished photographs.

It is the primary object of the present invention to provide automatic photographic apparatus of this general type which is in many important respects improved over the prior apparatus above referred to.

Thus, it is an important object of the present invention greatly to increase the plate-storage capacity of the apparatus without increasing the magazine size beyond dimensions previously found advantageous for various reasons, thereby permitting the storage of a much larger supply of sensitized plates in the apparatus at less frequent intervals, and accordingly reducing the cost of servicing the apparatus.

It is another important object of the present invention to provide for varying the duration of certain steps in the development and re-development of the exposed, sensitized paper of the plates without changing the time of the other functions of the apparatus, thereby obtaining equally good photographs with different kinds of sensitized paper from different manufacturers, for instance, or from the same kind of sensitized paper which, due to different age or other uncontrollable factors, requires different treatment for best photographic results.

It is another important object of the present invention to prevent jamming of, or possible damage to, the operating parts of the apparatus should a plate become stuck during its transfer from the magazine to the different stations in the apparatus.

It is another important object of the present invention more effectively to shield the sensitized plates in the apparatus from all unauthorized light, and to facilitate the shielding of these plates from unauthorized light when remounting certain mechanism or mechanisms of the apparatus after previous removal of the same for the inspection, repair or replacement of parts.

It is for another important object of the present invention to provide for agitation of a tray in which a previously exposed plate is subjected to the action of certain chemical solutions during its development and re-development, so as to accelerate the action of these solutions on the plate.

It is another important object of the present invention to provide for ready removal of the tray from the apparatus for cleaning the former, and for ready remounting of the cleaned tray in light-shielded position in the apparatus.

It is another important object of the present invention to render the apparatus inoperative when a plate becomes stuck therein, or when the supply of plates is exhausted, and, in the case of a coin-controlled apparatus, to provide for the return of a deposited coin or coins when the apparatus is thus rendered inoperative.

It is another important object of the present invention to provide readily controllable valves for the discharge of accurate amounts of the various chemical solutions and water used in the development and re-development of an exposed plate, in order to prevent waste of these liquids through the use of excessive amounts of the same, thereby also preventing splashing of these liquids and possible spoilage of non-exposed plates in the apparatus in consequence thereof.

It is also among the objects of the present invention to actuate certain widely spaced operating mechanisms of the apparatus electrically so as to permit the incorporation of their operating controls in a centralized unit, and to facilitate the automatic operation of these controls in accurate timed relation to each other.

The above and other objects, features and advantages of the invention will be fully understood from the following description considered in connection with the accompanying illustrative drawings.

Figures 1, 2:
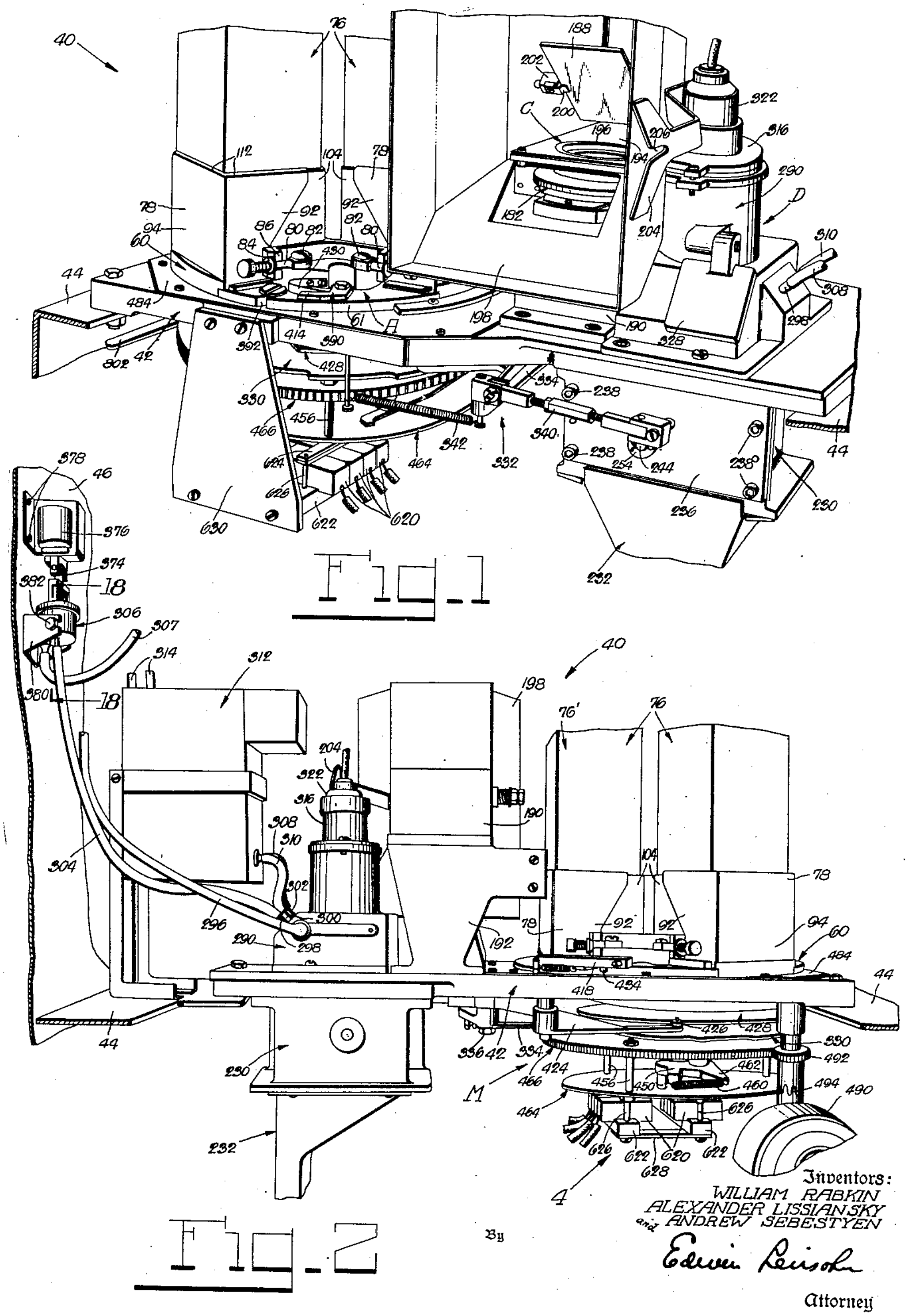
Fig. 1 is a fragmentary perspective view, from the front, of apparatus embodying the present invention.
Fig. 2 is a fragmentary perspective view, from the rear, of the same apparatus.
Figures 3, 4, 18, 19:
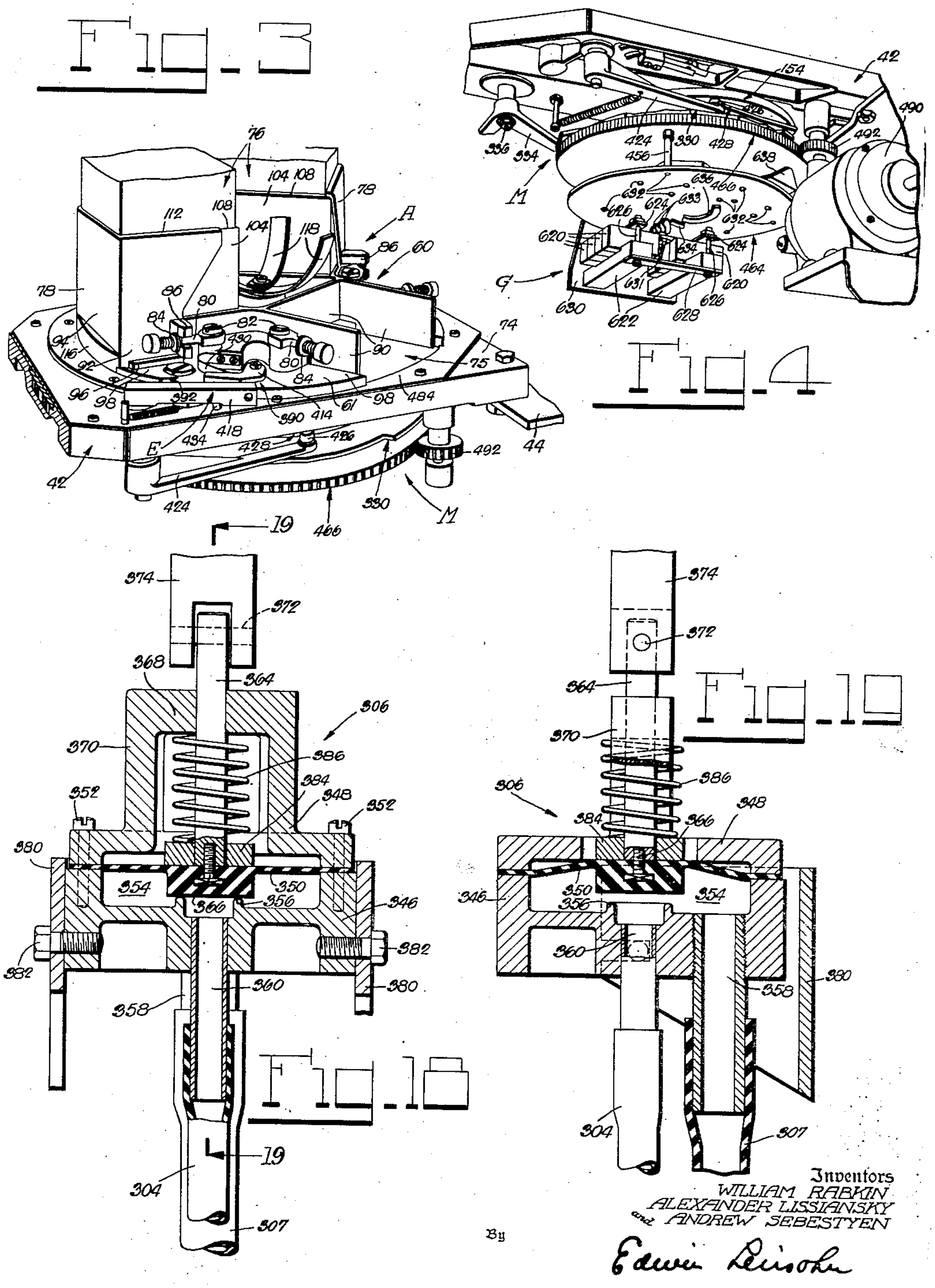
Fig. 3 is a fragmentary perspective view of certain mechanism of the apparatus.
Fig. 4 is a fragmentary perspective view of other mechanism of the apparatus, as though viewed in the direction of the arrow 4 in Fig. 2.
Figure 5:
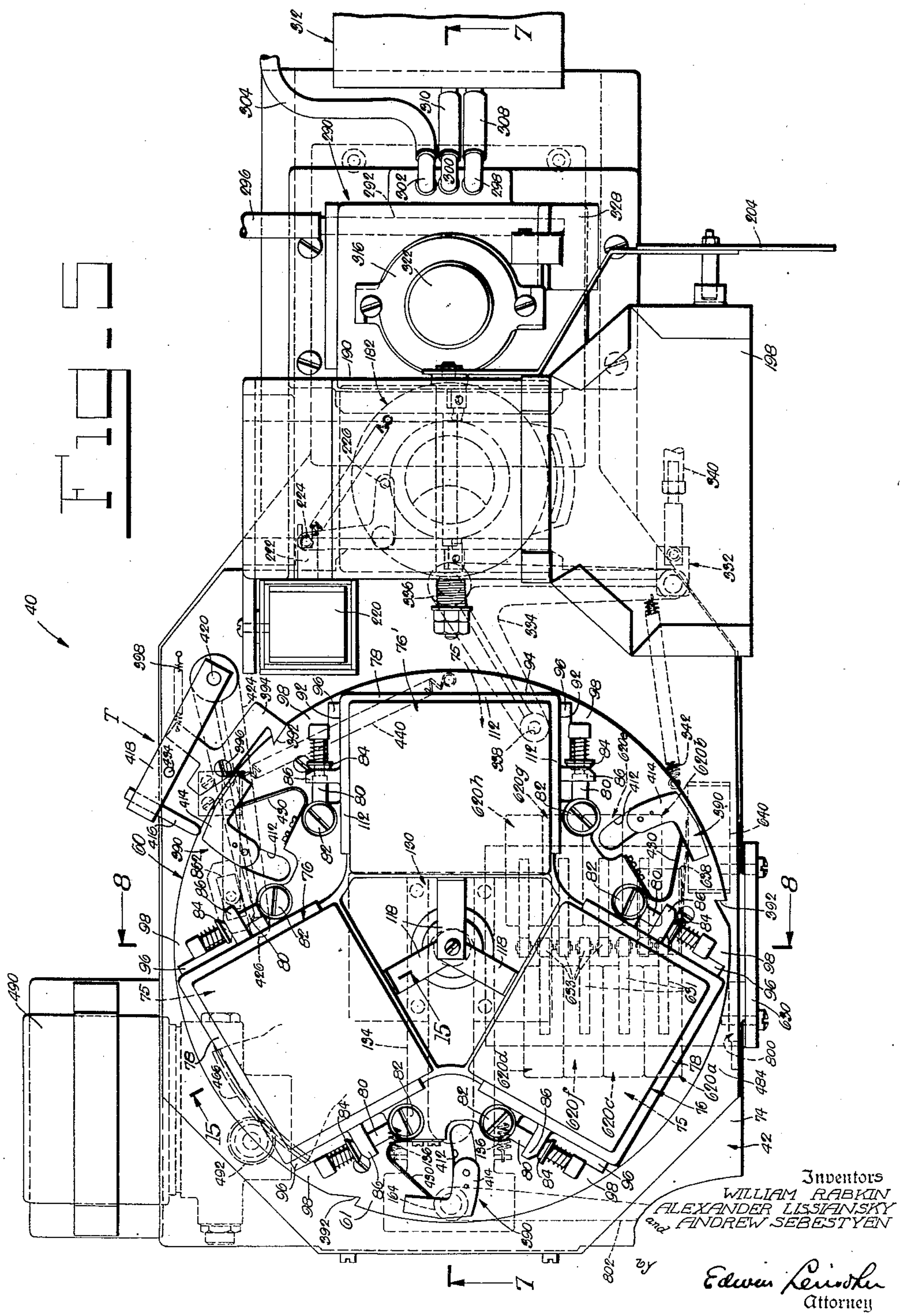
Fig. 5 is a top plan view of the apparatus.
Figures 6, 6A, 6B:
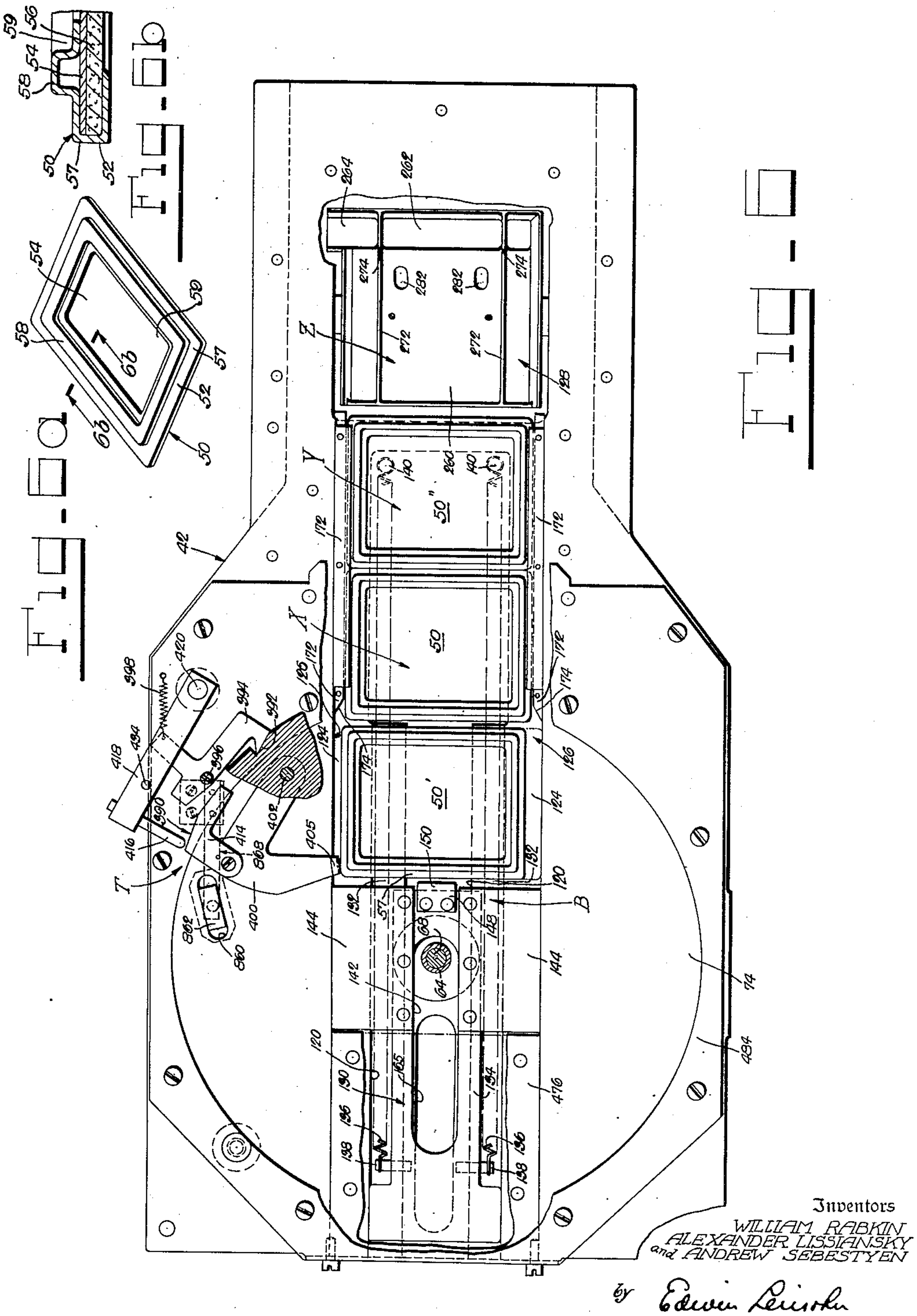
Fig. 6 shows, in plan view, part of the apparatus as though after the removal of certain mechanisms thereof.
Figure 7:
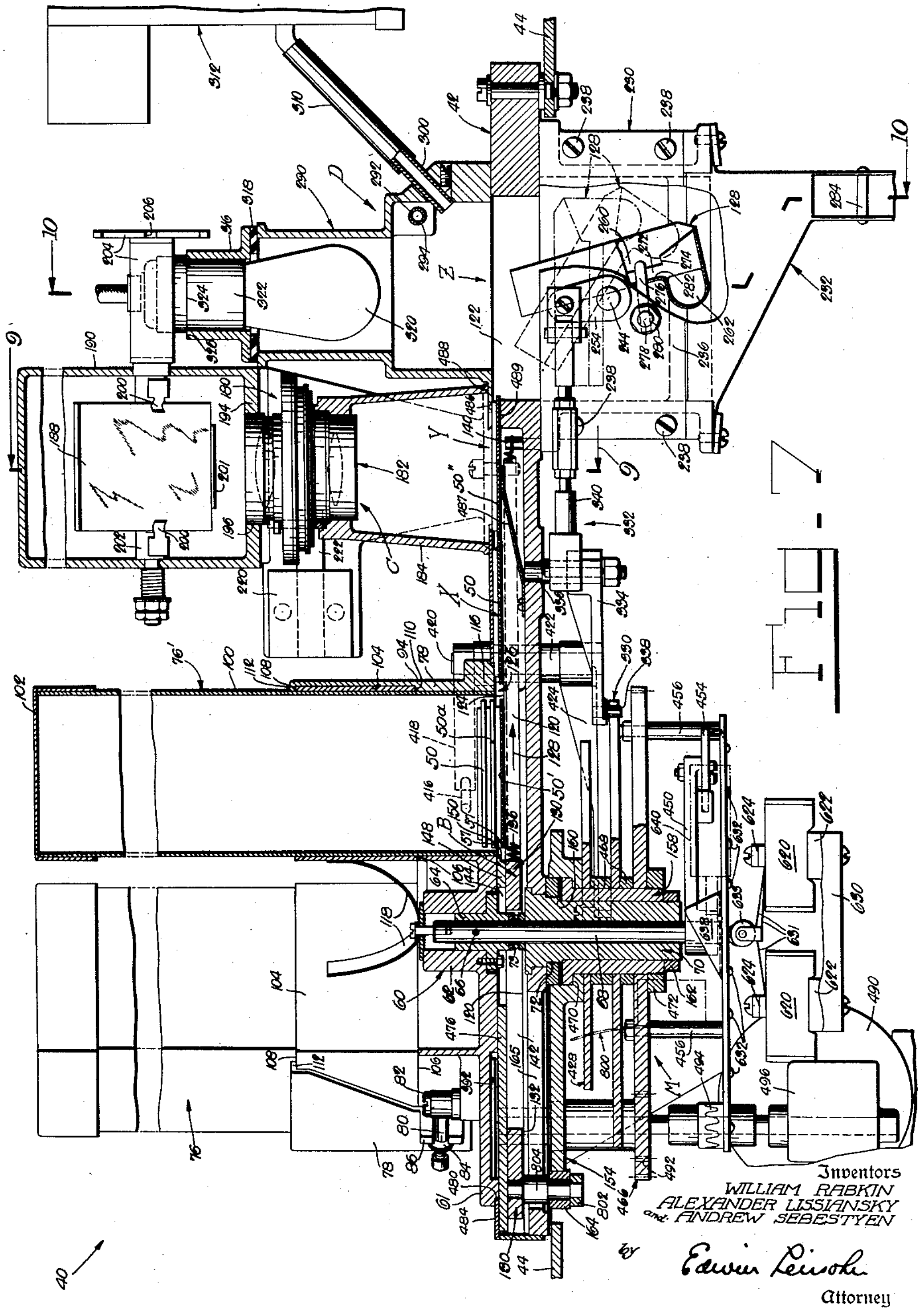
Figure 16:
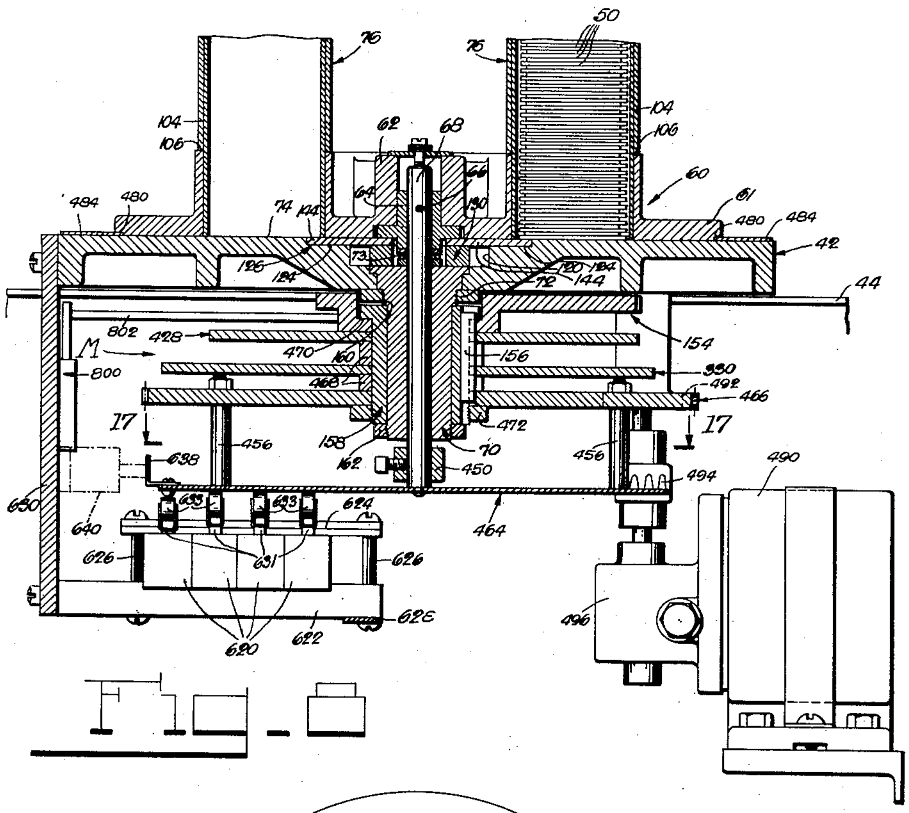
Figure 17:
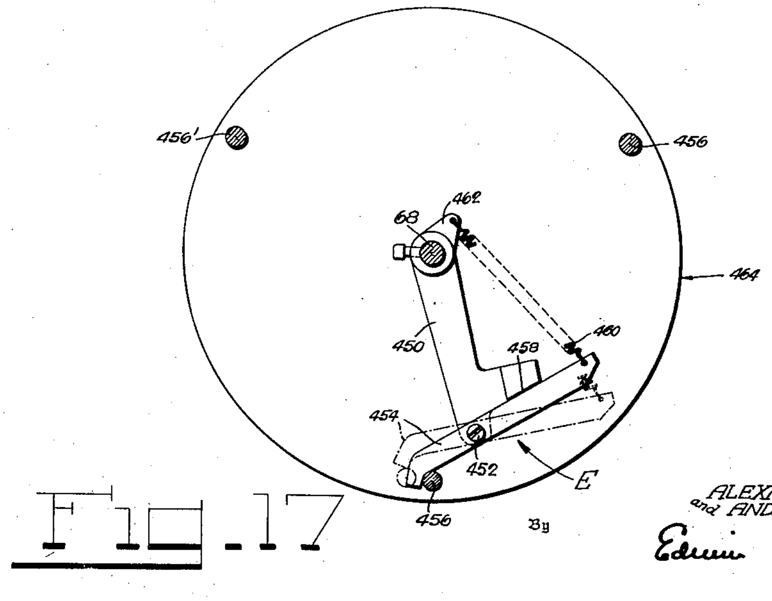
Figure 10:
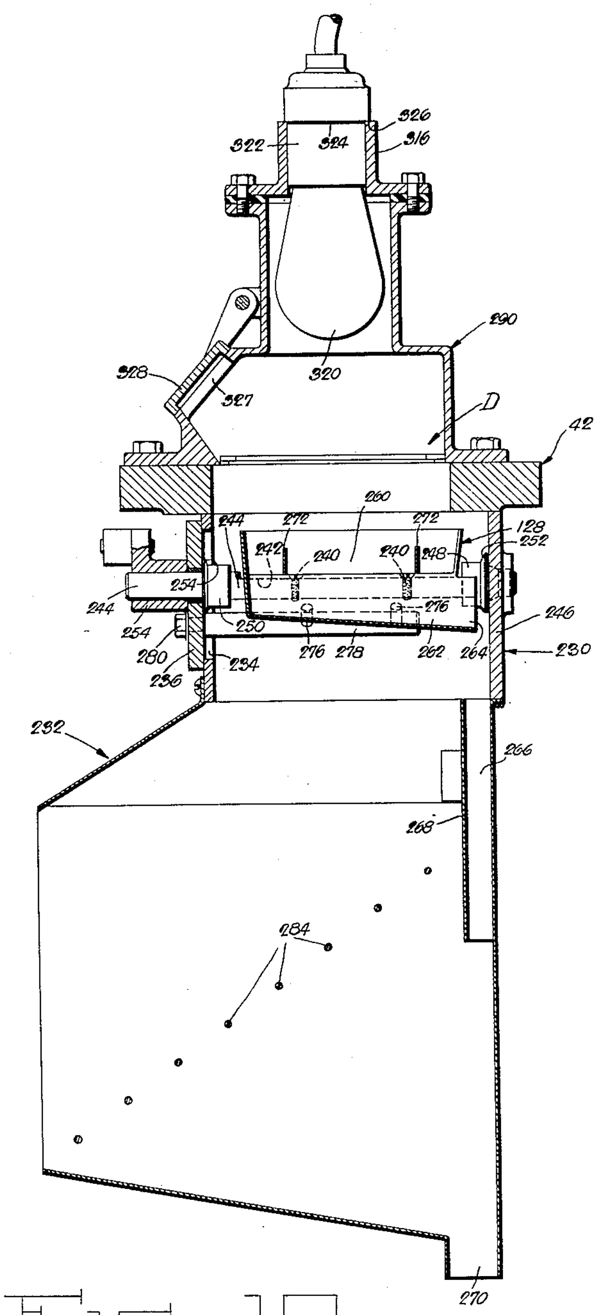
Figures 11, 12, 13, 14:
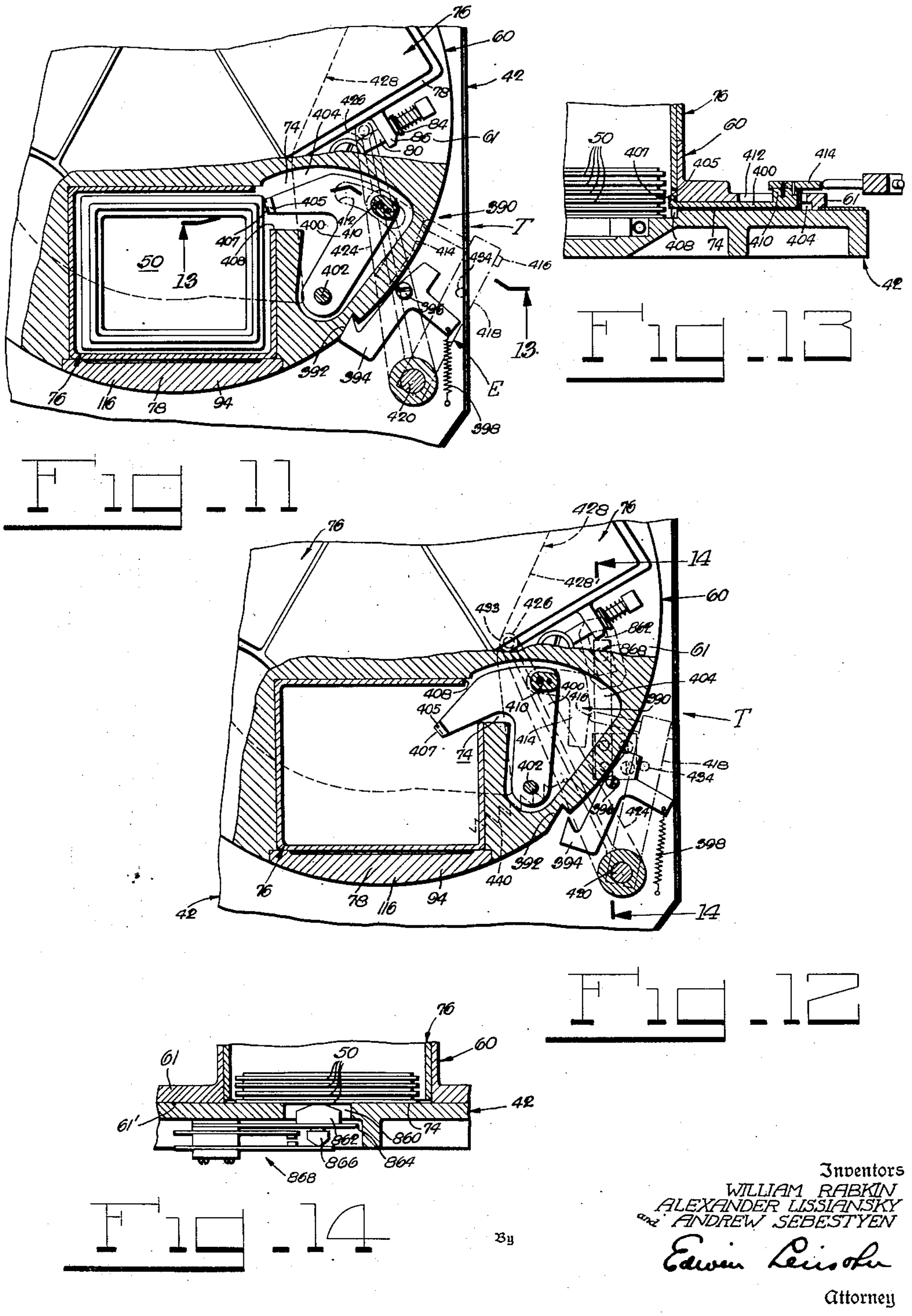
Figure 15:
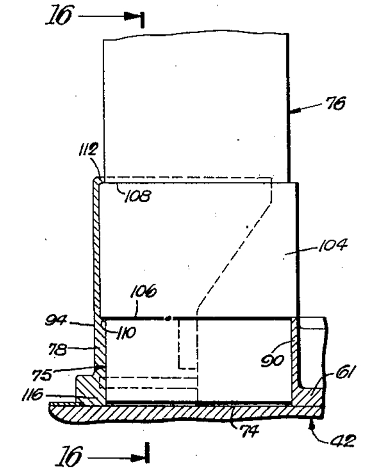
Figure 16:
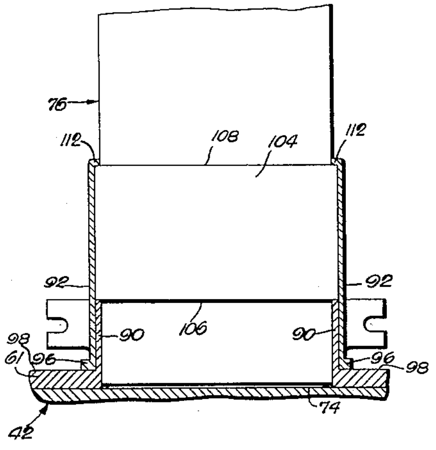
Figures 24, 25, 26, 27:
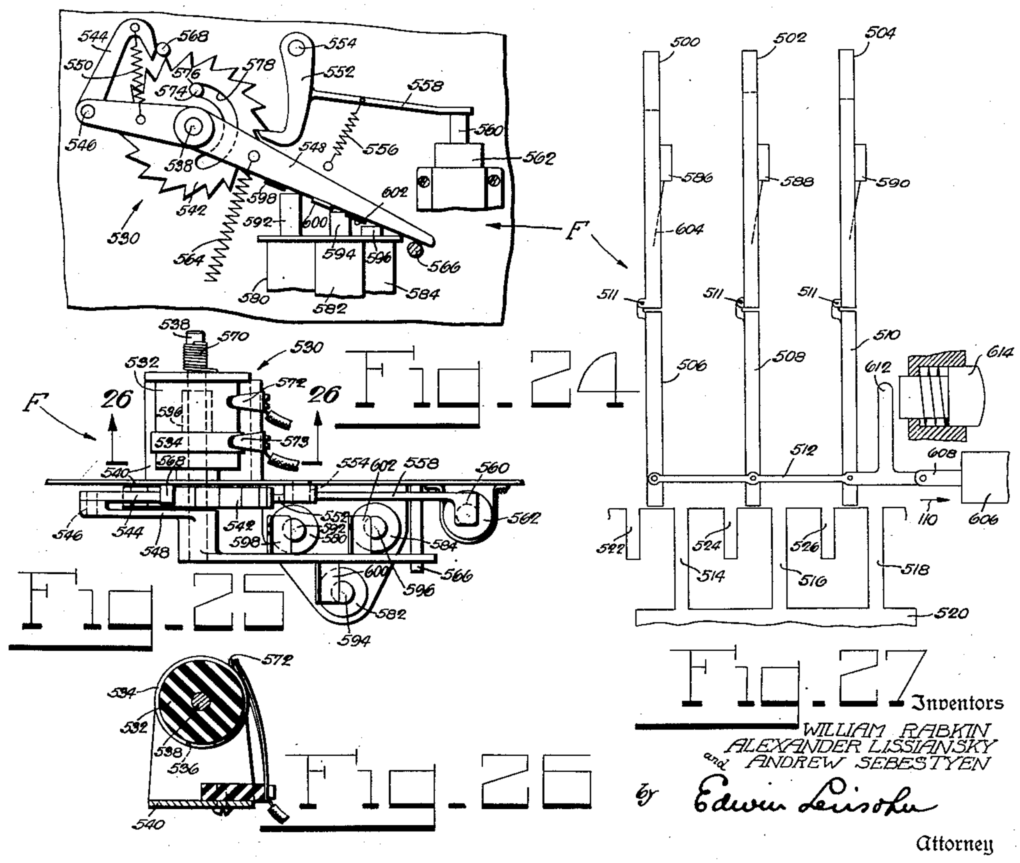
Figure 28:
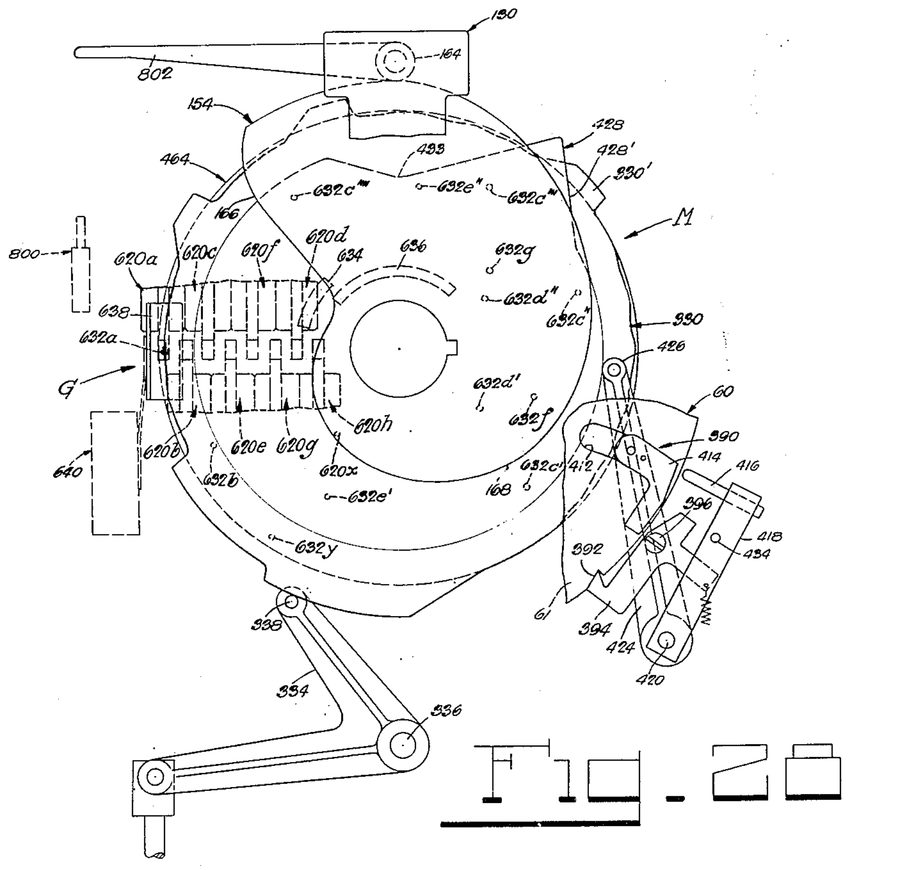
Figure 29:
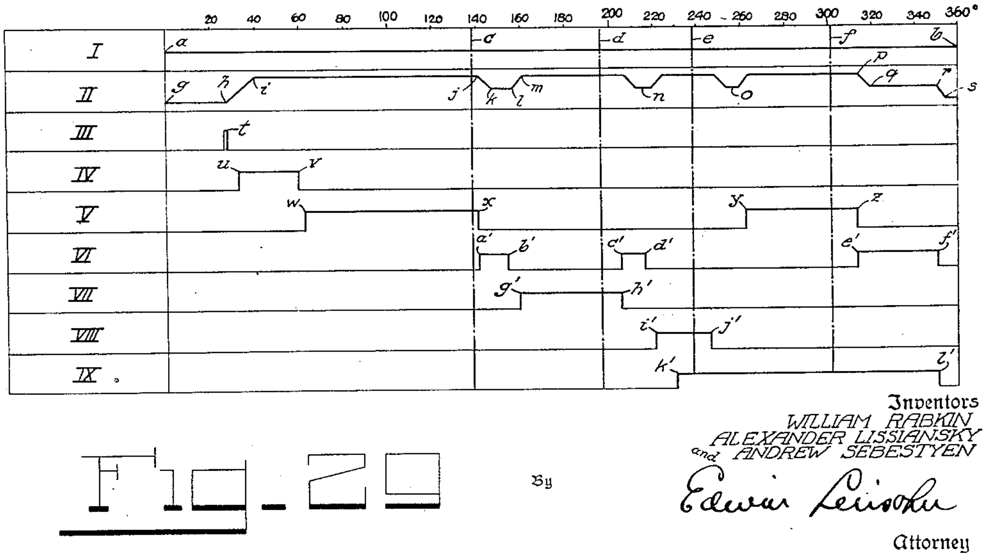
Figure 13:
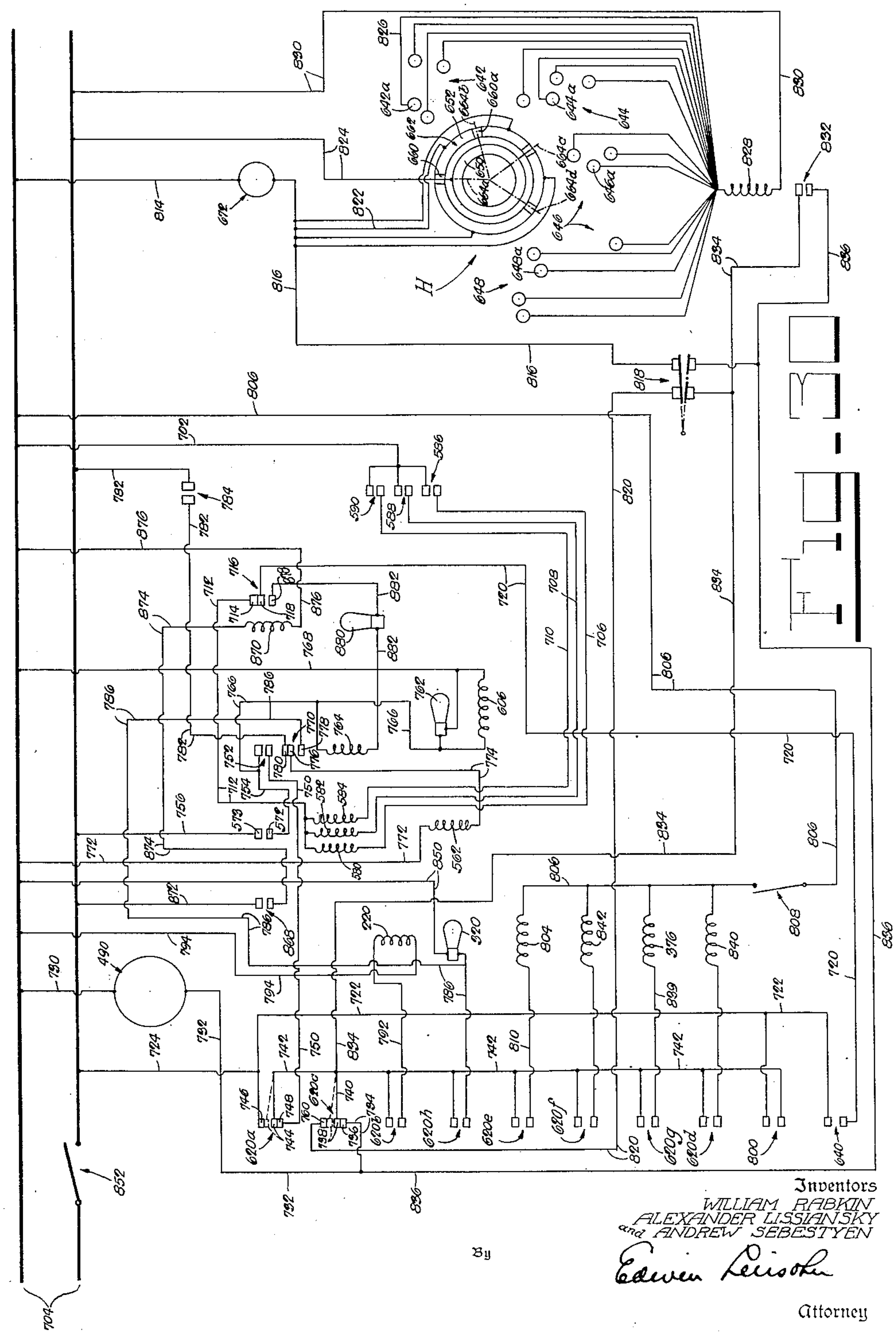

Fig. 6*a* is a perspective view of one of the sensitized plates used in the apparatus;

Fig. 6*b* is an enlarged fragmentary section taken on the line 6*b*—6*b* of Fig. 6*a*;

Fig. 7 is a longitudinal section through the apparatus taken substantially along the line 7—7 of Fig. 5;

Fig. 8 is a section taken substantially on the line 8—8 of Fig. 5;

Fig. 9 is a sectional view taken substantially on the line 9—9 of Fig. 7;

Fig. 10 is a section taken substantially on the line 10—10 of Fig. 7;

Fig. 11 is a fragmentary plan view, partly in section, of certain mechanism of the apparatus;

Fig. 12 is a view similar to Fig. 11, showing certain parts of the same mechanism in different operating positions;

Figs. 13 and 14 are fragmentary sections taken substantially on the lines 13—13 and 14—14, respectively, of Figs. 11 and 12, respectively;

Fig. 15 is a fragmentary section taken on the line 15—15 of Fig. 5;

Fig. 16 is a section taken on the line 16—16 of Fig. 15;

Fig. 17 is a section taken on the line 17—17 of Fig. 8;

Fig. 18 is a fragmentary section through a certain operating device of the apparatus, taken on the line 18—18 of Fig. 2 and drawn to an enlarged scale;

Fig. 19 is a section taken on the line 19—19 of Fig. 18;

Fig. 20 is a plan view of a certain time controller in the apparatus;

Fig. 21 is an elevational view of the controller shown in Fig. 20;

Figs. 22 and 23 are sections taken on the lines 22—22 and 23—23, respectively, of Fig. 21;

Fig. 24 is a fragmentary side elevation of another controller in the apparatus;

Fig. 25 is a plan view of the controller shown in Fig. 24;

Fig. 26 is a section taken on the line 26—26 of Fig. 25;

Fig. 27 is a diagrammatic illustration of certain coin mechanism used in the apparatus;

Fig. 28 is a diagrammatic illustration of certain operating cams of the apparatus, showing their relative disposition and indicating the timed relation of their functions;

Fig. 29 is a chart indicating the operations of the various mechanisms of the apparatus in timed relation to each other; and Fig. 30 is a wiring diagram illustrating the electrical devices and controls used in the apparatus and their electrical connections.

Referring to the drawings, and more particularly to Figs. 1, 2, 5 and 7 thereof, the reference numeral 40 designates automatic photographic apparatus which is preferably installed in a suitable cabinet (not shown) that may be like the one shown in the aforementioned Patent No. 2,192,755. The present photographic apparatus 40 comprises various operating mechanisms and devices, all of which are located in the cabinet just referred to, and most of which are mounted on a main support or bed 42, suitably secured by angles or plates 44 to the cabinet of which one side wall is shown at 46 in Fig. 2. The various operating mechanisms and devices of the apparatus are, Magazine turret A (Figs. 1 and 3); Plate transfer mechanism B (Figs. 6 and 7); Exposure mechanism C (Figs. 1, 7 and 9); Development and redevelopment mechanism D (Figs. 1, 7 and 10); Turret indexing mechanism E (Figs. 3, 11 and 17); Coin-operated starting mechanism F (Figs. 24 to 27); Electrical operating devices and their controls G (Figs. 4 and 28); and a Variable timer H (Figs. 20, 21 and 30). These mechanisms and devices are hereinafter described in the order in which they are mentioned above.

The type of sensitized plate 50 used in the apparatus may be as shown and described in the copending application of Rabkin et al., Serial No. 667,417, filed May 4, 1946, now abandoned, and comprises a generally rectangular frame 52 (Fig. 6*a*) which may be of any suitable material such as sheet metal or plastic, for instance. The frame 52 holds a sensitized paper 54 and a backing sheet 56, (see also Fig. 6*b*). The paper 54 and backing sheet 56 are preferably clamped in the frame 52, and the latter is provided with a continuous, raised rib or ridge 58. The rib 58, which is spaced inwardly from the outer margin of the frame 52 to leave a relatively thin border 57 thereon, forms together with the sensitized paper 54 a tray 59 for the reception of the chemical solutions used in the development and re-development of the exposed plate.

*Magazine turret A*

Referring to Figs. 1, 3, 5, 7 and 8, there is shown a turret 60 which has a round base 61 and a central hub 62, carrying a bushing 64 which is pinned at 66 to a vertical shaft 68, journalled in a boss 70 which is preferably clamped at 72 to the main support 42 of the apparatus (Fig. 7). A thrust bearing 73 between the bushing 64 and boss 70 bears the weight of the turret 60, and the latter rests only lightly on, or may even slightly clear, the machined top surface 74 of the main support 42 (Fig. 8). The turret 60 is provided with a plurality of equi-angularly spaced receptacles 75 (Figs. 3 and 5). In the present instance, the turret is provided with three of these receptacles 75 which are open at the bottom and on the outside of the turret, and are adapted for the reception of magazines 76 each of which holds a supply of sensitized plates 50 in the stacked relation shown in Fig. 8, with their light-sensitive faces up. Each magazine 76 is retained in its receptacle 75 in the turret by means of a holder 78 (Figs. 5, 7 and 15) which is removably secured to the turret. To this end, the turret 60 is provided on opposite sides of each receptacle 75 with arms 80 (Figs. 3 and 5) which are pivotally mounted at 82 and carry spring-urged collars 84, adapted to interlock with the lugs 86 on the adjacent holder 78 in the manner shown in Figs. 3 and 5, and thereby retain the latter in position on the turret. The opposite lugs 86 on each holder 78 are bifurcated to admit the adjacent arms 80 into the interlocking relation therewith shown in Fig. 5, for instance. It follows from the preceding that the provision on the turret of the pivoted arms 80 with their spring-urged collars 84, in conjunction with the lugs 86 on the holders 78, permit quick removal of said holders from, and equally quick mounting of the same on, the turret 60 for the replacement or refilling of any or all exhausted magazines 76.

More particularly, each receptacle 75 of the turret is defined by three upright walls 90 (Figs. 3, 15 and 16), and each holder 78 is slidable with its opposite side walls 92 over the adjacent walls 90 of a receptacle 75 in the manner best shown in Fig. 16, while the rear wall 94 of said holder closes the adjacent open side of said receptacle in the manner best shown in Fig. 15. The opposite side walls 92 of each holder 78 are provided with lateral flanges 96 (Figs. 3, 5 and 16), which are engageable with the machined top surface 98 of the base 61 of the turret, and serve accurately to locate the holder on the turret. The rear wall 94 of each holder 78 extends to, or substantially to, the machined top surface 74 of the main support 42 (Fig. 15) so as to close the open side of the adjacent receptacle 75 all the way to said main support 42.

The magazines 76 may be of the type shown and described in the patent to Rabkin, No. 2,215,230, dated September 17, 1940, and comprise a tubular body 100 of cardboard or the like, which is closed at the top as at 102 (Fig. 7), and open at the bottom after previous removal therefrom of a cover (not shown). Each magazine 76 may be loaded in the factory with sensitized plates 50 and shipped in these containers to any place where plates are required for a photographic apparatus of the present type. Hence, each magazine 76 serves not only to hold a supply of sensitized plates in the apparatus, but serves also as a package in which the sensitized plates are shipped from the factory, eliminating thereby the tedious task of transferring sensitized plates from a shipping container to a magazine in the apparatus. Each magazine 76 is also provided with an outer band 104 of cardboard or the like, which completely encircles the tubular body 100 and forms opposite shoulders 106 and 108. The shoulders 106 on each magazine rest on the top edges of the walls 90 of a receptacle 75 in the turret (Figs. 15 and 16) and on a shoulder 110 on the associated holder 78. The other shoulders 108 on each magazine 76 are engaged by inwardly turned top flanges 112 on the walls 92 and 94 of the associated holder 78. The engagement of the shoulders 106 and 108 of each magazine 76 with the associated receptacle 75 and holder 78 not only serves to hold the magazine longitudinally immovable on the turret, but also prevents outside light from reaching the open bottom of the magazine along the sides of the latter. The lower ends 116 of the rear walls 94 of the holders 78, which extend below the other walls 92 thereof to, or substantially to, the main support 42, interfit with the base 61 of the turret in the manner shown in Figs. 11 and 12, thus preventing light from reaching the open bottoms of the magazines through the turret base 61. Hold-down springs 118 are preferably provided (Figs. 3, 5 and 7) which force the outer ends of the holders 78 firmly against the turret to shut out light.

The abovementioned Patent No. 2,215,230 shows and describes a special, auxiliary cover (not shown) which may be used to advantage, after the removal of the regular cover from a magazine 76, to retain the plates in the magazine while placing the latter into the turret, without admitting enough light to the magazine to spoil the sensitized plates therein.

*Plate transfer mechanism B*

Referring to Figs. 6, 7 and 8, the main support 42 of the apparatus has in its top surface 74 a longitudinal groove 120 which extends from one end of said support 42 into close proximity to an opening 122 in the latter (Fig. 7). The top surface 74 of the support 42 is recessed at 124 on both sides of the groove 120 (Figs. 7 to 9) and throughout the length of the latter to the opening 122 (Fig. 7) to provide a track 126 for the transfer of sensitized plates 50 from one of the magazines 76 to an "exposure station" Y on the track (Fig. 6), and from there to a "development and re-development station" Z in a tray 128 beneath the opening 122 in the support 42.

The turret 60 normally assumes any one of three positions in which a magazine 76, in the present instance the magazine 76' in Figs. 5 and 7, is in operative alignment with the track 126 so that the sensitized plates 50 therein may discharge directly into the track. It appears from Fig. 7 that the open bottom of the magazine 76' terminates just outside the confines of the track 126, and that the latter is of a depth to admit only the lowermost plate 50' in the magazine so that the former clears the latter completely and may be advanced on the track in the direction of the arrow 128 in Fig. 7 without obstruction from the magazine. Fig. 7 also shows clearly that the plates overlying the lowermost plate 50' in the track 126 are held within the confines of the magazine 76'.

The discharged plate 50' is advanced on the track 126 successively to the stations Y and Z by means of a feed slide 130 (Figs. 6 and 7) which is preferably slidable on machined surfaces 132 in the groove 120. The slide 130 is preferably flush with the bottom of the track 126 as shown in Figs. 7 and 9, and has a shank 134 which is narrower than the groove 120 (Fig. 6) so as to provide space therein for springs 136 which function to draw the slide 130 forwardly in the direction of the arrow 128 in Fig. 7. The springs 136 are anchored with their ends on pins 138 and 140 on the slide 130 and in the groove 120, respectively. The slide 130 is longitudinally slotted as at 142 (Fig. 6) so as to clear the bushing 64 in the hub of the turret 60 when moving through its operating range. The rear end of the slide 130, which is wider than the shank 134 thereof, is guided in the groove 120 (Fig. 6), while the forward end of slide 130 is guided in the track 126 through intermediation of guide pieces or plates 144, secured to the top of the slide 130. The guide plates 144 on the slide 130 are flush with the top surface 74 of the main support 42 and hold the lowermost plate 50a in the magazine 76' within the confines of the latter while the plate 50' on the track 126 is being advanced thereon. The slide 130 is shown in Figs. 6 and 7 in its most retracted or home position in which the same clears the open bottom of the magazine 76' and is ready, on movement in the direction of the arrow 128 in Fig. 7, to advance plate 50' on the track 126. The slide 130 carries intermediate the guide plates 144 a separator 148 having a protruding lip 150 which, on advance of the slide from its home position (Fig. 7), projects between the adjacent outer borders 57 of the plates 50' and 50a and thus effects a clear separation between the plate being transferred and the nearest overlying plate which is still within the confines of the magazine 76'.

The feed slide 130 is yieldingly advanced from its home position by means of the previously described tension springs 136, and is returned to home position by a feed cam 154 which is keyed at 156 to a rotary sleeve 158, journalled on the boss 70 on the main support 42 (Figs. 7 and 8). The rotary sleeve 158 is held against axial movement on the boss 70 by being confined between an annular shoulder 160 on the latter and a nut 162 which is threaded over the lower end of the boss 70. Cooperating with the feed cam 154 is an anti-friction roller or follower 164, carried by the feed slide 130 and extending through a longitudinal slot 165 in the main support 42 (Fig. 7). The feed cam 154 is of the shape shown in Fig. 28 and turns through one revolution, clockwise as viewed in Fig. 28, during each cycle of operation of the apparatus. It appears from Fig. 28 that the feed cam 154 permits the slide 130 to pass through its yielding feed stroke when the follower 164 rides down the incline 166 on the feed cam, and that the slide is retracted into home position where the follower 164 cooperates with the ascending portion 168 of the feed cam.

The feed stroke of the slide 130 is such that the discharged plate 50′ from the magazine 76′ is advanced on the track 126 to the intermediate station indicated X in Figs. 6 and 7, whereby the previously discharged plates 50 in advance of plate 50′ are simultaneously advanced to the stations Y and Z, respectively, as will be readily understood. It also follows from Fig. 28, in which the feed cam 154 is shown in its home or rest position, that some time elapses, after the start of an operating cycle of the apparatus, before the feed cam 154 permits the advance of the slide 130, and it is during this initial time lapse in each cycle that the plate 50″ at the station Y is exposed in a manner to be described hereinafter. Hence, the foremost plate 50″ on the track 126 is already exposed when the feed slide 130 goes into action and advances the plates on the track, thereby ejecting plate 50″ from the track into the tray 128 at the station Z where the latter plate is developed and re-developed. On each retraction of the feed slide 130 into home position, after a previous advance of the plates 50 on the track 126, the lowermost plate 50*a* in the magazine 76′ is permitted to descend onto the track 126 for transfer on the next feed stroke of the slide, as will be readily understood.

Inasmuch as the plates 50 in each magazine preferably clear the sidewalls of the latter to insure their gravity descent therein as they are being used up (Figs. 7 and 11), the track 126 is, at least in the vicinity of the magazine 76′, of the same width as the latter, i. e., appreciably wider than a plate 50, as follows clearly from Fig. 6. However, in order to obtain a photograph in which the subject's image is well placed, it is imperative that a plate at the exposure station Y (Fig. 6) is accurately located with respect to the exposure mechanism to be described hereinafter. To this end, the track 126 is provided at the exposure station Y, and even in advance thereof, with superposed gibs 172 on each side (Figs. 6 and 9) between which the plates are accurately located and into which they are guided by the inclined leading edges 174 of the lower gibs 172 (Fig. 6).

*Exposure mechanism C*

Referring more particularly to Figs. 5, 7 and 9, the exposure mechanism C comprises a camera 180, having its lens assembly 182 mounted on a housing 184 which is, in turn, mounted at 186 on the main support 42 directly above the track 126 at the exposure station Y. Since in apparatus of this type the subject to be photographed is outside the compartment of the cabinet in which the present apparatus is mounted, the image of the subject has to be brought into optical registry with the lens assembly 182 of the camera by means of a reflector or mirror 188. To this end, a housing 190, which holds the mirror 188, is mounted on a pedestal 192 on the main support 42 (Figs. 2 and 9). The bottom wall 194 of the mirror housing 190 is provided with an opening 196 that fits over the adjacent end of the lens assembly 182 in the manner shown in Fig. 9. The mirror housing 190 is preferably extended to a wall 197 of the cabinet by means of a hood 198 (Fig. 9) which is suitably secured to the mirror housing. Thus, all light coming from the outside through the window 199 in the cabinet wall 197 (Fig. 9) is concentrated in the hood 198 and mirror housing 190, and is kept away from the rest of the apparatus.

The reflector or mirror 188 is preferably clamped at 200 to a holder 201 on a transverse shaft 202 in the housing 190 (Figs. 7 and 9). One end of shaft 202 carries, on the outside of the housing 190, a tilting arm 204, having at its forward end a notch 206 (Fig. 1) which receives a lateral pin 208 on an operating lever 210, suitably pivoted at 212 in the cabinet and having a handle portion 214 which is accessible to the subject to be photographed through an opening 215 (Fig. 9). The manually tiltable reflector 188 enables the subject in front of the window 199 (Fig. 9) to bring his or her image into optical registry with the lens assembly 182 for the exposure of a plate 50″ at the station Y. The manually tiltable reflector forms no part of the present invention, the same forming the subject matter of a co-pending application of Alexander Lissiansky, Ser. No. 648,299, filed February 18, 1946, now Patent No. 2,515,350 of July 18, 1950.

Suitably mounted on the pedestal 192 (Fig. 9) is a solenoid 220, the movable core 222 of which is operatively connected at 224 with the shutter mechanism 226 of the camera. The solenoid 220 is energized at a certain stage in an operating cycle of the apparatus, resulting in opening of the shutter of the camera and exposure of the sensitized plate 50″ at the station Y.

*Development and re-development mechanism D*

Referring more particularly to Figs. 1, 2, 7 and 10, the mechanism D includes the previously mentioned tray 128 into which a sensitized plate 50 is ejected from the track 126 after its exposure at the station Y (Fig. 6). The tray 128 is located in a casing 230 which is suitably mounted on the bottom of the main support 42. The frame 230 is at its bottom in open communication with a discharge chute 232 for the finished picture and for the various liquids used in the development and re-development of the same. The casing 230 is also open at one side as at 234 (Fig. 10) and is normally closed thereat by a cover 236 which is removably secured to the casing 230 by screws 238 (Fig. 7). The tray 128 is mounted by screws 240 on the flat surface 242 of a tilter shaft 244 (Fig. 10) which is rotatably mounted with one end in the removable cover 236 and removably journalled with its opposite end in the adjacent wall 246 of the casing 230. The shaft 244 carries collars 248 and 250 which are provided with annular deflectors 252 and 254, respectively, to divert splashing liquids in the casing 230 away from the journal bearings of the tilter shaft 244 and to prevent light from entering the casing 230 through said journal bearings. The shaft 244 carries on the outside of the cover 236 a rocker 254, and since both the rocker 254 and the adjacent collar 250 on the tilter shaft 244, are mounted on the latter, it follows that the tilter shaft 244 and the tray 128 thereon are removable from the casing 230 together with said tilter shaft.

The tray 128 is preferably of the form shown in Figs. 6 and 10, and comprises a comparatively shallow receptacle 260 which is open at one end to an integral, inclined drain channel 262 the discharge end 264 of which is vertically above a drain 266 formed in the discharge chute 232 by a baffle 268 therein. The discharge chute 232 is provided at its lower end with an opening 270 which is vertically below the drain 266 and through which the waste liquids discharge into a sump (not shown). Rising from the bottom of the receptacle 260 of the tray are spaced parallel ribs 272 which extend throughout the length of said receptacle and also bridge the drain channel 262 in the manner best shown in Fig. 6. The ribs 272 serve to support an exposed plate 50 flatwise with the light sensitive face thereof up.

The tray 128 is tiltable into the several positions shown in full, dotted, and dot-and-dash lines in Fig. 7. In the dot-and-dash line or "developing" position of the tray shown in Fig. 7, the same is ready to receive an exposed plate 50, and the tray 59 of said plate (Fig. 6*a*) may in this position of the tray receive the various chemical solutions used in the development and re-development of the plate. While the plate 50 in the tray 128 is subjected to the action of the various chemical solutions, the tray 128 is also rocked back and forth in a manner described hereinafter, to agitate the respective chemicals in the tray 59 of the plate and thereby accelerate their action upon the latter. The tray 128 shown in dotted lines in Fig. 7 is in the "drain-off" position in which the various chemical solutions used flow off the plate therein and escape through the drain channel 262 and drain 266 (Fig. 10), the plate being then held in the tray on the shoulders 274 on the ribs 272. Rinsing water is also squirted against the plate 50 in the tray 128 while the latter is in the "drain-off" position in which the water will mostly drain through the channel 262 of the tray rather than splash toward the adjacent end of the track 126 and spoil a sensitized plate or plates 50 thereon. In the full line or "ejecting" position of the tray 128 shown in Fig. 7, the finished plate 50 therein is ejected by means of spaced pins 276 (Figs. 7 and 10) which are carried by a bar 278, mounted at 280 on the removable cover 236. The bottom of the tray is provided with apertures 282 (Fig. 7) through which the ejector pins 276 enter the tray when the latter is tilted into the "ejecting" position, the pins 276 then lifting the finished plate 50 over the retaining shoulders 274, whereupon the plate will slide off the tray 128 and into the discharge chute 232 (Fig. 10). The ejected plate 50 falls on a downwardly inclined row of spaced transverse pins 284 in the chute 232 and is guided on the same to a receptacle (not shown) from which the finished plate or photograph may be picked up.

Mounted on top of the main support 42 is a housing 290 the bottom of which is in open communication with the casing 230 through the opening 122 in said main support (Fig. 7). Extending into the housing 290 is a pipe 292 (Figs. 5 and 7) having a multitude of orifices 294 through which rinsing water is squirted against a plate 50 in the tray 128 when the latter is in the "drain-off" position shown in dotted lines in Fig. 7. The inner end of the pipe 292 is closed, and the outer end thereof has a flexible hose connection 296 with a valve (not shown) by which the discharge of water from the pipe 292 is regulated in a manner to be described hereinafter. Extending into the housing 290 are three more conduits 298, 300 and 302 (Figs. 5 and 7) through which the various chemical solutions are discharged into a plate 50 in the tray 128 when the latter is in the "developing" position shown in dot-and-dash lines in Fig. 7. The conduit 302 has a flexible hose connection 304 with a valve 306 (Fig. 2) which communicates through a hose connection 307 with a supply tank (not shown) holding clearing solution usually employed in the treatment of photographic plates of this type. The discharge of cleaning solution into the plate in the tray 128 is regulated by the valve 306 in a manner described hereinafter. The other conduits 298 and 300, through which the remaining chemical solutions (developer and bleaching solution) used in the present re-development process are discharged into the plate in the tray 128, are connected through conduits 308 and 310, respectively, with a preheater 312 (Figs. 2 and 5) in which these solutions are, prior to their application, preheated to a temperature most suitable for obtaining maximum speed in the action of these chemicals upon the exposed plate. The developer and the bleaching solution are conducted from separate supply tanks (not shown) to the preheater 312 through flexible hose connections 314, (Fig. 2), and their discharge is controlled by valves (not shown) which may be of the same type as the valve 306 shown in Fig. 2 for the clearing solution. The preheater 312 may be of any suitable construction and heat electrically. Since the same forms no part of the present invention, no further description thereof is deemed necessary.

The top of the housing 290 is closed by a cover 316 (Fig. 7), a gasket 318 being preferably interposed to shut out light. The cover 316 serves as a socket for the reception of an electric light bulb 320 used in the re-exposure of a sensitized plate in the tray 128. The base 322 of the light bulb 320 has an annular shoulder 324 which rests on the machined top surface 326 of the cover 316 to shut out light from the housing 290. The housing 290 may also be provided with an inspection window 327 (Fig. 10) which is normally closed by a hinged cover 328 to shut out light from said housing.

The tray 128 is rocked into the various positions by means of a tilter cam 330 through intermediation of operating linkage 332 (Figs. 1, 5 and 7). The tilter cam 330 is keyed at 156 to the rotary sleeve 158. The operating linkage 332 comprises a bell-crank lever 334, pivotally mounted at 336 on the main support 42 and having on one arm a follower 338 which cooperates with the tilter cam 330. The other arm of the lever 334 is connected by a lengthwise adjustable link 340 with the rocker 254 on the tilter shaft 278. The follower 338 is held in permanent engagement with the tilter cam 330 by a spring 342 which normally urges the lever 334 in a clockwise direction as viewed in Fig. 5. The cam 330 is so designed (Fig. 28) that it causes the previously mentioned agitation of the tray 138, as well as the tilting of the latter into each of the positions shown in Fig. 7, at predetermined intervals in an operating cycle of the apparatus.

Since the control valves for the various chemical solutions and the rinsing water are all alike, only the valve 306 in Fig. 2 will be described with particular reference to Figs. 18 and 19. The valve 306 comprises a valve body 346 and a cover 348 between which is interposed a flexible diaphragm 350. More particularly, the diaphragm 350 is clamped between the valve body 346 and the cover 348 by screws 352 by which the cover is secured to the valve body. The diaphragm 350 forms a fluid chamber 354 in the valve body, and the latter is provided with a valve seat 356 on which the diaphragm 350 is normally seated to close the valve. The valve body 346 is also provided with an inlet 358 and an outlet 360. The inlet 358 has the previously mentioned hose connection 307 with a source of the clearing solution, while the outlet 360 receives the hose connection 304 (Fig. 2).

The diaphragm 350 has secured thereto a stem 364 by means of a screw 366 the head of which is preferably embedded in the diaphragm as shown in Figs. 18 and 19. The stem 364 extends through the yoke 368 of a U-shaped portion 370 of the cover 348, and has its end connected at 372 with the core 374 of a solenoid 376 (Fig. 2) which is suitably mounted at 378 on the wall 46 of the cabinet. The valve body 346 is mounted on the same cabinet wall 46 through intermediation of a bracket 380 and mounting screws 382. Interposed between a collar 384 on the stem 364 and the yoke 368 of the cover is a compression spring 386 which normally urges the diaphragm against the seat 356 to close the valve. On energization of the solenoid 376 at the proper time in an operating cycle of the apparatus, the diaphragm 350 is raised from its seat 356, thereby permitting solution in the chamber 354 to flow through the outlet 360 and hose connection 304 to the discharge conduit 302 (Fig. 5). The opening of the valve 306 by the action of the solenoid 376 is positive and instantaneous, and its closing by the spring 386, after de-energization of the solenoid 376, is equally positive and instantaneous, wherefore solution is discharged in accurate amounts proportionate to the duration of the energization of the solenoid 376. Since the other solutions used in the development and re-development of an exposed plate are controlled by similar valves, they are also discharged in accurate amounts proportionate to the duration of the energization of the solenoids of their respective valves.

*Turret indexing mechanism "E"*

Provisions are made to index the turret 60 after the supply of sensitized plates in the presently used magazine 76 is exhausted, in order to bring the next loaded magazine into operative alignment with the track 126. To this end, there is associated with each magazine on the turret a testing device 390 (Fig. 5) which controls the operation of the turret indexing mechanism when its associated magazine is exhausted. The turret 60 is provided in its base 61 with three equi-angularly spaced notches 392, each being associated with a magazine. A latch 394 cooperates with either one of the notches 392 to arrest the turret in the angular position in which the associated magazine is in operative alignment with the track 126. The latch 394 is pivotally mounted at 396 on the main support 42, and is normally urged into latching engagement with the turret by means of a spring 398 (Fig. 11).

Since the testing devices 390 are exactly alike, only one of these devices will be described with reference to Figs. 6, 11 and 12. The device comprises a bell crank lever 400 which is pivotally mounted at 402 in a recess 404 in the bottom of the turret, and is provided with a test finger 405, having a preferably serrated edge 407. Lever 400 has a raised boss 410 (see also Fig. 13) which extends through an arcuate slot 412 in the base 61 of the turret and carries a contact member 414 thereabove (see also Fig. 5). Lever 400 is normally urged into its most retracted position shown in Figs. 11 and 13 by means of a spring 430 (Fig. 5) which engages the contact member 414. In the most retracted position of the lever 400 (Fig. 13), the test finger 405 is substantially within the confines of a notch 408 in the associated magazine 76, and slightly clears the plates 50 in the latter.

To operate a testing device 390, the same has to be at the testing station T shown in Figs. 5, 6, 11 and 12, while the associated magazine 76 is in operative alignment with the track 126. The testing device 390 at the testing station T is operated by a stud 416 on an operating arm 418, which is carried by one end of a vertical stub shaft 420, journalled in a boss 422 on the main support 42 (Fig. 7). The other end of the stub shaft 420 carries a lever 424 (Figs. 3, 5, 7, 11 and 12) having a follower 426 which is urged by a spring 440 into engagement with a control cam 428, keyed at 156 to the rotary sleeve 158.

Once during each operating cycle of the apparatus, i. e., when the low portion 433 of the control cam 428 (Fig. 28) is adjacent the follower 426 on the lever 424, the latter may yield counter-clockwise as viewed in Fig. 28 to the extent illustrated in Fig. 12. In order that the lever 424 may yield to this extent, however, the test finger 405 of the testing device 390 at the station T must be free to enter the adjacent magazine 76 to the extent shown in Fig. 12, as will be readily understood from the preceding. The test finger may thus enter the adjacent magazine if the same is exhausted, as shown in Fig. 12. However, if the test finger 405 encounters even a single remaining plate in the magazine, it is stopped in the position shown in Fig. 11, with the result that the parts 418, 416 and 424 stop in the position shown in the same figure. Thus, when the test finger 405 does not encounter a plate in the exhausted magazine, it will be permitted to move into the latter to the extent shown in Fig. 12, with the result that a depending pin 434 on the arm 418 will rock the latch 394 out of latching engagement with the turret and thus release the same for an indexing step. However, if the test finger 405 encounters even a single plate in the magazine, the arm 418 will be stopped in the position shown in Fig. 11 in which its pin 434 does not reach the latch 394. Hence, the turret is released for an indexing step only when the presently used magazine is exhausted. Cam 428 has also a rising portion 428' (Figs. 12 and 28) which turns the lever 424 clockwise as viewed in Fig. 12 against the tendency of the spring 440 to turn it in the opposite direction. The rising cam portion 428' and the cooperating spring-urged lever 424 act as a brake on the cam-carrying sleeve 158 at the time in each operating cycle when the follower 164 on the spring-urged feed slide 130 rides down the abrupt incline 166 on the feed cam 154, thus presenting the spring-urged slide 130 to shoot forward and, in doing so, accelerate the cams on the sleeve 158 and get the apparatus out of time.

To index the turret 60, after its release from the latch 394 in the above described manner, the following mechanism is provided. Mounted on the lower end of the turret shaft 68 is an arm 450 (Figs. 7, 8 and 17) which pivotally carries at 452 a pawl 454, adapted to be driven by any one of three equi-angularly special studs 456 which turn above the turret shaft 68 as hereinafter described. The pawl 454 is normally urged against a shoulder 458 on the arm 450 by means of a spring 460 which is anchored with one end on said pawl and with the other end on a lateral extension 462 of said arm. When the pawl 454 is thus engaged with the shoulder 458 of the arm 450, the same is in the path of clockwise rotation of the studs 456 as viewed in Fig. 17. The turret 60 will thus be indexed in any of its three operating positions by the nearest approaching stud 456 after the turret is released from the latch 394, the spring 460 being sufficiently tensioned to prevent the pawl 454 from yielding and riding over said stud in the manner shown in dot-and-dash lines in Fig. 17. However, when the turret is arrested by the latch 394 against clockwise rotation as viewed in Fig. 11, the pawl 454 will merely yield and ride over any passing stud 456 in the manner indicated in dot-and-dash lines in Fig. 17. The studs 456 serve to suspend an electrical control disk 464 from a disk gear 466 in spaced relation thereto (Fig. 8). The disk gear 466 is, in turn, mounted on the rotary sleeve 158 by means of the key 156. The parts 428, 330 and 466 on the rotary sleeve 158 are held in spaced relation to each other by means of intervening spacers 468, and all the parts on said rotary sleeve 158 are held thereon between the annular shoulder 470 and a nut 472 on said sleeve (Fig. 8). The cams 154, 428, 330 and the control disk 464 on the rotary sleeve 158 may, for convenience, be termed the "cam assembly M."

The cam 428 is so designed and coordinated with the other cams of the assembly M that it permits the indexing of the turret after the feed cam 154 has, in an operating cycle of the apparatus, advanced the last descended plate from the exhausted magazine on the track 126, so that the indexing of the turret will not interfere with any of the subsequent operations performed by the apparatus during the remainder of the same operating cycle. Since the pawl-carrying arm 450 (Fig. 17) is indexed with the turret and since the latch 394 releases the turret at the same instant in any operating cycle of the apparatus, it stands to reason that the studs 456 progressively index the turret into its three operating positions. Thus, if the stud 456' (Fig. 17) will next index the turret, the other two studs 456 will cause the two following indexing steps, respectively, of the turret, as will be readily understood.

In order that the filled magazines may, during indexing steps of the turret, cross the rear end of the track 126 without discharging plates into the same, the track 126 is closed thereat by a filler plate 476 (Figs. 6 and 7). The filler plate 476 is flush with the machined top surface 74 of the main support 42 on which rest the lowermost plates in the magazines when the latter are not in operative alignment with the track 126.

Provisions are made effectively to shield the track 126 as well as the open bottoms of the magazines 76 in the turret from outside light. To this end, the base 61 of the turret as well as the holders 78 fitted therein are provided at the bottom with a machined annular recess 480 (Figs. 7 and 8) into which projects an apertured plate 484 on top of the main support 42. The interengaging surfaces of the plate 484 and the recessed turret effectively prevent outside light from reaching the open bottoms of the magazines along the bottom of the turret. The plate 484 also extends to, and considerably beneath, the camera housing 184 (Fig. 7) and effectively shields the track 126 between the turret and the camera C from outside light. The camera housing 184 and the adjoining housing 290 have machined mounting surfaces which engage the machined top surface 74 of the main support 42 and thus prevent light from entering thereat. The housing 290 has also a plate-like extension 486 at the bottom which interfits with a correspondingly shaped recess 488 in the bottom of the housing 184 (Fig. 7), thus preventing outside light from entering said housing from that direction. The track 126 is also shielded from the re-exposure light emanating during a predetermined time interval in each operating cycle from the bulb 320 in the housing 290, by having the foremost plate 50'' on the track fit between the extension 486 of the housing 290 and a surface 489 of the main support 42 which is flush with the bottom of the track 126 as shown in Fig. 7. Thus, while the passage between the extension 486 and the adjacent surface 489 is sufficiently large to permit the ejection therethrough of the foremost plate 50'' on the track, this same passage does not permit light from the housing 290 to enter the track as long as a plate 50'' fits in said passage in the manner shown in Fig. 7. A spring 487 is preferably provided (Fig. 7) which forces the plate 50'' against the extension 486 of the housing 290 so as further to prevent light from the housing 290 to reach the up-turned, light-sensitive face of the plate 50'' and spoil the same. Also, the bell crank lever 400 of each testing device 390, together with the contact member 414 thereon, cover the adjacent slot 412 (Figs. 11 and 13) in any position of said lever 400 and, hence, prevent the passage of light through said slot 412.

*Coin-operated starting mechanism F*

The various mechanisms of the present apparatus are either directly operated by, or their operation is under the control of, the several parts 154, 428, 330 and 464 of the cam assembly M. As mentioned heretofore, the cam assembly makes one complete revolution during each operating cycle of the apparatus. In order to turn the cam assembly M, there is provided a main driving motor 490 (Figs. 2, 4, 5, 6 and 7) which drives the disk gear 466 through intermediation of a pinion 492, an axially expansible coupling 494 and suitable reduction gearing 496.

In order to close the electrical circuit of the driving motor 490 for an operating cycle of the apparatus, the coin-operated mechanism shown in Figs. 24 to 27 is provided. Thus, deposition of a coin or coins in the apparatus is required in order to start the latter in operation, and coin-deposit chutes 500, 502 and 504 (Fig. 27) are provided for that purpose at some convenient place on the cabinet in which the present apparatus is mounted. Coins deposited in the chutes 500, 502 and 504 will drop by gravity into lower chute extensions 506, 508 and 510, respectively, which are pivotally connected with the latter at 511. The chute extensions 506, 508 and 510 are interconnected by a link 512 for joint pivotal movement to and from registry with chutes 514, 516 and 518, respectively, which lead to a coin box 520 accessible only to a person having a special key to open the same and being authorized to remove its contents. The chute extensions 506, 508 and 510 may also be swung in the opposite direction into registry with chutes 522, 524 and 526, respectively, which lead to a coin-return receptacle (not shown) accessible to the depositor of the coins. The chutes 500, 502 and 504 are constructed for the reception of coins of different denominations, respectively. Thus, chute 500 may receive quarter pieces, chute 502 may receive dimes and chute 504 may receive nickels. In the present instance, the operation of the apparatus requires the deposition of 25¢ in form of a single coin or in any combination of the coins mentioned. Thus, the present apparatus may perform an operating cycle on deposition of a single quarter piece, or of two dimes and one nickel, or of a dime and three nickles, or of five nickels alone.

In order that the apparatus may respond to the deposition of the above-mentioned coin or coins when totalling 25¢, an electrically operated totalizer 530 is provided. As shown in Figs. 24 and 25, the totalizer, which may be suitably mounted in the cabinet in which the present apparatus is housed, comprises a contact roll 532 of any suitable insulating material which carries a closed contact ring 534, having a laterally projecting tongue 536. Contact roll 532 is mounted on a shaft 538 which is suitably journalled in a bracket 540, and carries a ratchet disk 542 with which cooperates an indexing pawl 544, pivotally mounted at 546 on a lever 548 which is pivoted intermediate its ends on the shaft 538. A spring 550 normally urges the pawl 544 into engagement with the ratchet disk 542. Pawl 544 is adapted to index the ratchet disk 542 counter-clockwise as viewed in Fig. 24, while a holding pawl 552 is adapted to cooperate with the ratchet disk normally to prevent rotation of the same in the opposite direction. The holding pawl 552 is pivotally mounted at 554 on the bracket 540, and is urged into operative engagement with the ratchet disk 542 by a spring 556 (Fig. 24) which acts on a laterally extending arm 558 of said holding pawl. The end of the arm 558 is in operative alignment with the movable core 560 of a solenoid 562 which, on energization of the latter, raises the arm 558 and thereby rocks the holding pawl 552 out of engagement with the ratchet disk 542. Lever 548 is normally urged by a spring 564 into engagement with a stop pin 566 (Fig. 24) in which position the indexing pawl 544 is cammed out of engagement with the ratchet disk 542 by a pin 568. The contact roll 532 is normally urged by a torsion spring 570 into the "zero" position shown in Figs. 25 and 26, in which a contact blade 572 is angularly spaced from the lateral tongue 536 on the contact ring 534. Unwinding of the contact roll 532 beyond the "zero" position in Fig. 26 is prevented by a pin 574 on the bracket 540 (Fig. 24), which projects into an arcuate slot 578 in the ratchet and engages the end wall 576 thereof when the contact roll is in its "zero" position. The slot 578 is of such length as to permit indexing of the ratchet disk and, hence, of the contact roll 532, through an angular range equivalent to 5 consecutive teeth on the ratchet disk 542, since it requires indexing to that extent of the contact roll 532 from its "zero" position in order to bring the latter into starting position in which the contact ring 534 and its lateral tongue 536 bridge the contact blades 572 and 573 and thereby close the electrical circuit for the main driving motor 490 to start an operating cycle of the apparatus.

The ratchet disk 542 is indexed into the starting position just described by means of solenoids 580, 582 and 584 which are energized on actuation of switches 586, 588 and 590, respectively, by a coin or coins deposited in the chutes 500, 502 and 504, respectively, with which said switches are associated in the manner shown diagrammatically in Fig. 27. The movable cores 592, 594 and 596 of the solenoids 580, 582 and 584, respectively, are adapted to cooperate with lateral lugs 598, 600 and 602, respectively, on the index lever 548 (Fig. 25) for the purpose of rocking the latter counter-clockwise as viewed in Fig. 24 to index the ratchet disk 542, and, hence, the contact roll 532 toward or into starting position.

For instance, a 25¢ piece deposited in the chute 500 (Fig. 27) will actuate the blade 604 of the associated switch 586, causing thereby momentary closure of the latter and, hence, energization of the solenoid 580 (Figs. 24 and 25) and consequent outward movement of its core 592, resulting in indexing of the ratchet disk 542 and contact roll 532 directly into starting position, i. e., through an angular range equivalent to five teeth on the ratchet disk 542. Hence, the totalizer 530 may be brought into starting position on deposition of a single quarter-dollar piece in the chute 500.

The apparatus may, as already explained, be started on deposition of coins other than quarter-dollar pieces. Thus, two dimes and one nickel may be deposited in the appropriate chutes 502 and 504 (Fig. 27) in order to start an operating cycle of the apparatus. To this end, the first dime dropped in the chute 502 will actuate the associated switch 588, causing thereby energization of the solenoid 582 and outward movement of its core 594 so that the ratchet disk 542 and contact roll 532 are indexed through an angular distance equivalent to that of two ratchet teeth. At this stage, the totalizer 530 is advanced two-fifths toward starting position, and will be advanced through the remaining three-fifths of its indexing range on deposition of a second dime in the chute 502 and consequent indexing of the ratchet disk 542 through the same distance as before, and on further deposition of a nickel in the chute 504 which will cause indexing of the ratchet disk 542 through the remaining one-fifth of its indexing range into starting position through intermediation of the switch 590 (Fig. 27) and the associated solenoid 584 with its core 596.

It follows from the preceding that the solenoids 580, 582 and 584 are operated selectively for indexing the totalizer 530 into starting position, depending on the denomination of the coin or coins deposited in the apparatus. Of course, the solenoids 580, 582 and 584 are only momentarily energized, wherefore their respective cores return to their normal retracted position (Fig. 24) immediately after causing indexing of the ratchet disk 542, the holding pawl 552 being then operative to prevent unwinding of the ratchet disk 542 and contact roll 532 into "zero" position. At a predetermined point in each operating cycle of the apparatus, the solenoid 562 (Fig. 24) is energized, causing thereby withdrawal of the holding pawl 552 from the ratchet disk 542 and permitting the latter and the contact roll 532 to return to the "zero" position shown in Fig. 24, ready for the next indexing operation to start another operating cycle of the apparatus on deposition therein of the correct coin or coins after the conclusion of the present operating cycle.

Substantially at the start of an operating cycle of the apparatus, a solenoid 606 (Fig. 27) is energized in a manner to be described hereinafter, whereby its core 608, which is drivingly connected with the link 512, is moved in the direction of the arrow 610 in order to swing the chute extensions 506, 508 and 510 into alignment or registry with the coin discharge chutes 514, 516 and 518, respectively, through which the deposited coin or coins are conducted to the cash box 520. Associated with a lateral extension 612 of the link 512 is a yielding push button 614 which is accessible to the depositor of the coins and may be depressed by him or her in order to cause, under certain conditions to be described hereinafter, the return of the deposited coin or coins from the apparatus. In that even, depression of the push button 614 will cause shifting of the chute extensions 506, 508 and 510 into alignment or registry with the coin return chutes 522, 524 and 526, respectively (Fig. 27), for the return of the coin or coins to the depositor.

*Electrical operating devices and their controls G*

Referring more particularly to Figs. 4, 5, 7, 8 and 28, there is shown a series of conventional snap switches 620 which are mounted in two rows on spaced supports 622 by means of hold-down bars 624 and bolts 626. The supports 622 are braced at one end by a cross tie 628, and are suitably mounted at the other end on a depending bracket 630 on the main support 42 (Fig. 8). The snap switches 620 are of well known construction, each having a depressible arm 631 to close the switch. The arms 631 of the switches 620 carry rollers 633 which are adapted to cooperate with cams on the control disk 464 for the depression of the switch arms 631 and according closure of the respective switches 620.

The various switches 620 serve for the following purposes: Switch 620*a* (Figs. 5 and 28) is a stop switch the function of which will be described hereinafter in connection with the wiring diagram shown in Fig. 30. Switch 620*b* is a "shutter" switch which is in circuit with the shutter solenoid 220 (Fig. 9). Switch 620*c* is a "timer" switch for the variable timer H described hereinafter. Switches 620*d*, 620*e*, 620*f* and 620*g* control the solenoid-operated valves for the water, developer, bleaching solution and clearing solution, respectively, used in the development and redevelopment of an exposed sensitized plate 50. Finally, switch 620*h* is a "second exposure" switch which is in circuit with the second exposure bulb 320 (Fig. 7). Most of the cams on the control disk 464 for actuating the switches 620 are formed by the heads 632 of screws which are threaded into said control disk, while two of the cams are in the form of arcuate strips 634 and 636 which are adapted to actuate the water control and second exposure switches 620*d* and 620*h*, respectively. As best shown in Fig. 28, the screwhead 632*a* is adapted to actuate the stop switch 620*a*, the screwhead 632*b* is adapted to actuate the shutter switch 620*b*, the screwheads 632*c* are adapted to actuate the timer switch 620*c*, while the screwheads 632*d*, 632*e*, 632*f* and 632*g* are adapted to actuate the switches 620*d*, 620*e*, 620*f* and 620*g*, respectively.

As earlier mentioned, the control disk 464 makes one complete revolution during each operating cycle of the apparatus, so that the various switches 620 perform their designated functions in an operating cycle of the apparatus during one revolution of the control disk 464. The control disk 464 also carries on its periphery a cam element 638 (Figs. 4 and 7) which is adapted to actuate a "credit" switch 640 (Figs. 8 and 28), suitably mounted on the depending bracket 630. The function of this switch 640 is to prevent the totalizer 530 from becoming indexed on deposition of the correct coin or coins in the apparatus while the latter passes through an operating cycle, affording the depositor the opportunity to have the deposited coin or coins returned under these circumstances since the apparatus will start the next operating cycle only on deposition of the correct coin or coins after the conclusion of the present operating cycle. The sequence and timed relation of the operation of the various switches 620 and 640 will be described in detail hereinafter.

*Variable timer H*

Inasmuch as the sensitized paper used in the photographic plates 50 requires, for previously stated reasons, treatment of varying duration by the liquid chemicals in the development and redevelopment of the plates, in order to obtain equally good photographic results with all kinds of sensitized paper, there is provided in the apparatus the timer H by means of which the duration of the treatment of the plates by the developer, the bleaching solution and the clearing solution may be varied selectively in a manner hereinafter described in connection with the wiring diagram in Fig. 30. The timer H is located at any convenient place in the cabinet in which the present apparatus is mounted, and comprises a support 641 (Figs. 20 and 21) carrying different sets of contacts 642, 644, 646 and 648. The support 641 carries also a closed contact ring 650 the center of which is indicated at *x* in Fig. 20. Surrounding the contact ring 650 are arcuate conductive tracks 652, 654, 656 and 658 which are associated with the contact sets 642, 644, 646 and 648, respectively, and spaced from each other by insulating separators 660. The arcuate tracks 652 to 658 form, together with the separators 660, a circular track 662.

Cooperating with the various contacts on the support 641 is a contact arm 664 (Fig. 21) on a stub shaft 666 which extends through the support 641 and is suitably coupled at 668 to the drive shaft 670 of a timer motor 672 which operates at very low, but constant speed, say one R. P. M. The contact arm 664 is secured to the stub shaft 666 by a long screw 673 which threadedly receives a weight 675 for accurately balancing the contact arm 664. Suitably mounted on the bottom side of the contact arm 664 is a conductive strap 674 with which fixed contacts 676 and 677 and an adjustable contact 678 are in permanent conductive engagement. Each fixed contact may be of the type shown in Fig. 22, and comprise a shoe 680 having a shank 682 which is slidable in diametrically opposite internal grooves 684 in a conductive bushing 686 which is press fitted or otherwise secured in the contact arm 664 and in conductive engagement with the contact strap 674 thereon. The fixed contacts 676 and 677 are urged by their respective springs 688 into engagement with the contact ring 650 and the circular track 662, respectively (Fig. 20). The adjustable contact 678 (see also Fig. 23) is carried by a slide 690 on the contact arm 664, and the former may be locked to the latter in four different positions of adjustment by means of a holding screw 692 which may be threadedly received in either one of four holes 694 in the contact arm 664. Contact 678 is movable in diametrically opposite internal grooves 696 in a conductive bushing 698 which is carried by the slide 690 in permanent conductive engagement with the contact strap 674 on the contact arm 664 (Fig. 23). Contact 678 is normally urged against the support 641 by a spring 700.

The contact set 642 on the support 641 (Fig. 20) is associated with the first developer application in the treatment of an exposed sensitized plate 50, while the contact sets 644, 646 and 648 are associated with the application of the bleaching solution, clearing solution and the second developer, respectively, in the treatment of the same plate. It will be noticed in Fig. 20 that the contacts of the several sets 642 to 648 are arranged in four concentric rows of which each row contains one contact of each set.

In the operation of the timer H, the contact ring 650 is connected with a source of electricity, and the permanently engaged contact 676 serves to connect the contact ring 650 with the contact strap 674. The fixed contact 677, the contact strap 674 and the adjustable contact 678 on the contact arm 664 serve electrically to connect the conductive tracks 652 to 658 with any one of the contacts of the associated sets 642 to 648, respectively. The contact arm 664 is in the home position indicated by dot-and-dash line 664*a* when the apparatus is at rest.

*Mode of operation of apparatus*

As previously mentioned, the present apparatus forms a complete cycle of operation during one complete revolution of the cam assembly M (Figs. 7 and 28) which is driven by the main driving motor 490. The circuit of the main driving motor is closed in the following manner for an operating cycle of the apparatus. On deposition of the proper coin or coins in one or more of the chutes 500, 502 and 504 (Fig. 27), the associated switch or switches 586, 588 and 590 are closed, resulting in closure of a "credit" circuit in which the latter switches and their associated solenoids 580, 582 and 584 (Figs. 24 and 30) are connected in parallel. The credit circuit, which may be traced in the wiring diagram in Fig. 30, comprises a lead 702 between one side of any suitable electrical power source 704 and the switches 586, 588 and 590, leads 706, 708 and 710 between the latter switches and their associated solenoids 580, 582 and 584, a lead 712 between said solenoids and a switch 716, a lead 720 between switch 716 and the previously mentioned "credit" switch 640, and leads 722 and 724 between switch 640 and the other side of the power source 704. Switch 716 is of the double pole type and normally assumes the position shown in Fig. 30 in which the movable contact 718 is in engagement with the pole 714 thereof, while the credit switch 640 is closed by the cam element 638 on the control disk 464 when the apparatus is in its home or rest position (Figs. 7 and 8). The credit circuit just described is closed on actuation of one or more of the switches 586, 588 and 590 by a coin or coins deposited in the associated coin chutes (Fig. 27).

Energization of one or more of the solenoids 580, 582 and 584 in consequence of the deposition of the correct coin or coins in the apparatus will bring the totalizer 530 into its operative position in which the contact blades 572 and 573 (Fig. 25) are bridged by the lateral tongue 536 on the contact ring 534. Bridging of the contact blades 772, 573, as just described, results in the closure of a starting circuit for the main driving motor 490. This starting circuit (Fig. 30) comprises a lead 730 between one side of the power source and the motor 490, leads 732 and 734 between the motor 490 and the timer switch 620*c*, leads 740 and 742 between said timer switch and the stop switch 620*a*, a lead 750 between said stop switch and a normally open but presently closed switch 752 as described hereinafter, a lead 754 between the latter switch and a "starting switch" constituted by the contact blades 572 and 573 (see also Fig. 25), and a lead 756 between said starting switch and the other side of the power source 704. The timer switch 620*c* and the stop switch 620*a* are of the double-pole type. The timer switch 620*c* normally assumes the position shown in Fig. 30 in which the movable contact 738 engages the pole 736 thereof, while the stop switch 620*a* is normally in a position in which the movable contact 744 engages the pole 746 thereof. When the apparatus is in its home or rest position, however, the cam 632*a* on the control disk 464 (Fig. 28) forces the movable contact 744 of the stop switch 620*a* into engagement with the other pole 748 thereof as shown in Fig. 30, with the result that the described starting circuit for the main driving motor 490 is closed when the starting switch 572, 573 is closed by the totalizer 530.

Immediately after the start of an operating cycle of the apparatus, the cam 632*a* on the control disk 464 (Fig. 28) moves out of operative engagement with the stop switch 620*a*, permitting thereby the movable contact 744 thereof to move into normal engagement with the pole 746 thereof as shown in dotted lines in Fig. 30, with the result that the starting circuit for the motor 490 is opened, but a main motor circuit is simultaneously closed. The main motor circuit comprises the leads 730, 732 and 734, the timer switch 620*c*, the leads 740 and 742, the stop switch 620*a* (in dotted line position), and the lead 724. It follows from the preceding that the main motor circuit just described may, during an operating cycle of the apparatus, be opened by throwing the timer switch 620*c* from the position shown in Fig. 30 into the other position in which contact 738 engages the other pole 760 thereof. Whenever the main motor circuit is thus opened by the timer switch 620*c* during an operating cycle of the apparatus, the main driving motor 490 stops and the timer H goes into operation in a manner described hereinafter.

Simultaneously with the closure of the previously mentioned starting circuit of the main driving motor 490, a branch circuit thereof is closed which includes an electric light bulb 762 (Fig. 30), the coin-release solenoid 606 (see also Fig. 27), and a relay 764. This branch circuit includes the starting switch 572, 573 and the leads 754 and 756 of the starting circuit, and further comprises leads 766 and 768 across which the solenoid 606, the light bulb 762 and the relay 764 are connected in parallel, and of which lead 768 is connected with the other side of the power source 704. Evidently, this branch circuit is closed as long as the starting switch 572, 573 is closed, i. e. for a considerable time after the main motor circuit took over the operation of the main driving motor 490. The light bulb 762 may be placed conspicuously on the cabinet in which the apparatus is housed, and serves to indicate to the subject to be photographed to be on the alert and sit still for the exposure by the camera of the apparatus which will soon take place, as appears hereinafter. The solenoid 606 performs, on energization, its designated function of shifting the pivoted chute extensions 506, 508 and 510 (Fig. 27) into registry with the coin-discharge chutes 514, 516 and 518, respectively, through which the deposited coin or coins are conducted into the cash box 520. The relay 764, when energized closes the previously mentioned switch 752 in the starting circuit of the main driving motor 490, and also actuates a double-pole switch 770 which is in circuit with the winding of the "reset" solenoid 562 (see also Fig. 24). The circuit of this "reset" solenoid has a trunk portion comprising a lead 772 between one side of the power source 74 and the reset solenoid 562, and a lead 774 between the latter solenoid and the movable contact 776 of the switch 770. From there the circuit has two branches leading from the poles 778 and 780, respectively, of the switch 770 to the other side of the power source 794. The branch leading from pole 780 comprises a lead 782, and an interposed, normally open switch 784. The other branch leading from pole 778 of switch 770 comprises a lead 786, the second exposure switch 620*h*, lead 742, stop switch 620*a* and lead 724. The movable contact 776 of the switch 770 is normally in engagement with the pole 780 thereof, but is forced into engagement with the other pole 778 when the relay 764 is energized. Hence, the circuit of the reset solenoid 562 is closed when the second exposure switch 620h is closed while the starting switch 572, 573 is still closed in an operating cycle of the apparatus. To close the second exposure switch 620*h* for that purpose, the control disk 464 is provided with a cam in the form of a screwhead 620*x* (Fig. 28) which closes the second exposure switch 620*h* at a certain point in an operating cycle, causing thereby energization of the reset solenoid 562 and consequent spring-return of the totalizer 530 to zero position and opening of the branch circuit which includes the "sit still" light 762, the coin-release solenoid 606 and the switch-holding relay 764.

After the start of an operating cycle of the apparatus the first cam on the control disk 464 to actuate one of the switches 620 is cam 632*b* (Fig. 28) which will close the shutter switch 620*b*, resulting in energization of the shutter solenoid 220 (Fig. 30) by way of lead 724, stop switch 620*a*, lead 742, shutter switch 620*b*, and leads 792 and 794. Next to actuate one of the switches 620 in the same operating cycle of the apparatus is the cam 620*x* (Fig. 28) which causes energization of the reset solenoid 562 in the above-described manner.

The next cam on the turning control disk 464 to actuate a switch 620 is in form of a screwhead 632*y* (Fig. 28) which actuates the stop switch 620*a* into the full line position shown in Fig. 30, when the feed slide 130 is, in the operating cycle of the apparatus, substantially at the end of its feed or forward stroke. Actuation of the stop switch 620*a* by the cam 632*y* as just described, results in opening of the previously described main motor circuit, as will be readily understood. Hence, the apparatus would come to a stop at this point in the operating cycle, were it not for the provision of a holding circuit for the main driving motor 490 which includes a "jam control" switch 800 (Figs. 5, 7, 8 and 28) connected with the leads 722 and 742 in the manner shown in Fig. 30. The jam control switch 800 is actuated by an arm 802 which is mounted on a depending stud 804 on the feed slide 130 on which the follower 164 is journalled. The jam control switch 800 is mounted on the depending bracket 630 (Fig. 8), and is so located thereon that it will be actuated by the arm 802 when the feed slide 130 is substantially at the end of its feed stroke, i. e. at the time when the cam 632*y* on the turning control disk 464 actuates the stop switch 620*a* to open the main motor circuit. Actuation at this time of the jam control switch 800 by the arm 802 causes closure of a holding circuit for the main driving motor 490, which comprises leads 724 and 722, the jam control switch 800, leads 742 and 740, the timer switch 620*c*, and leads 734, 732 and 730. Hence, the main driving motor 490 does not stop despite the interruption of the main circuit thereof in consequence of the actuation of the stop switch 620*a* by the cam 632*y*. Although the feed slide 130 starts to retract immediately on reaching the end of its feed stroke, the bar 802 thereof nevertheless holds the switch 800 in the holding circuit closed until the cam 632*y* on the turning control disk 464 has moved out of engagement with the stop switch 620*a*, thus insuring that the latter may reclose the main circuit of the driving motor 490 before the holding circuit thereof is opened. The purpose of the jam control switch 800 is, of course, to stop the apparatus in case one or more of the sensitized plates 50 on the track 126 become jammed. If a jam takes place, the arm 802 on the feed slide 130 evidently fails to reach the switch 800, with the result that the main driving motor 490, and, hence, the apparatus, will stop when the cam 632*y* actuates the stop switch 620*a*. The apparatus is thus stopped until the jammed plate or plates in the track 126 are released or removed.

Next to actuate one of the switches 620 is the cam 632*e'* on the turning control disk 464 (Fig. 28), which actuates the developer valve 620*e* for the first application of developer to an exposed sensitized plate in the tray 128. More particularly, this switch is in circuit with the solenoid 804 that operates the previously mentioned developer valve (not shown). The circuit of the solenoid 804 is closed through a lead 806 with an interposed manual switch 808, the solenoid 804 itself, a lead 810, the developer switch 620*e*, lead 742, stop switch 620*a*, and lead 724.

Next to operate a switch 620 in the operating cycle of the apparatus is the cam 632*c'* on the turning control disk 464, which will actuate the timer switch 620c into the dotted-line position shown in Fig. 30. When switch 620c is thus actuated, the main motor circuit is interrupted and the main driving motor 490 will come to an immediate stop so that the cam 632c will remain in operative engagement with the timer switch 620c. Actuation by the cam 632*c'* of the timer switch 620c into the dotted line position shown in Fig. 30 renders the timer H operative, by closing a main circuit of the timer motor 672 (see also Fig. 21). This main circuit may be traced in Fig. 30, and comprises a lead 814, the timer motor 672 itself, a lead 816, a manual control switch 818, a lead 820, the timer switch 620*c*, leads 740 and 742, the stop switch 620*a*, and lead 724. As earlier mentioned, the contact arm 664 (Fig. 21) assumes the position indicated by dot-and-dash line 664a in Figs. 20 and 30 when the timer is inoperative. As soon as the timer motor 672 starts, the contact arm 664 turns clockwise as viewed in Figs. 20 and 30, whereby a holding circuit for the timer motor 672 is closed immediately after the fixed contact 677 on the contact arm 664 rides off the insulated separator 660 and onto the conductive track 652. This holding circuit comprises (Fig. 30) the lead 814, the timer motor 672, a lead 822, the conductive track 652, contact 677 and conductive strap 674 as well as contact 676 on the arm 664, the conductive ring 650 on which contact 676 rides, and a lead 824.

Assuming now that the adjustable contact 678 on the arm 664 is set as indicated in Fig. 21, i. e., for cooperation with the contacts 642a, 644a, 646a and 648a (Figs. 20 and 30), the arm 664 will turn, whereby the adjusted contact 678 thereon is brought into engagement with contact 642a, at which time the main driving motor 490 will restart, as will be described presently. Contact 642a, which will then receive current from the adjusted contact 678 on the arm 664, is connected by a lead 826 with a relay 828 which is, in turn, connected by a lead 830 with the other end of the power source 704. Hence, the relay 828 is energized when the contact 678 on the arm 664 reaches in its travel the contact 642a, and closes a normally open switch 832 in a "motor-restart" circuit. This latter circuit comprises lead 724, the stop switch 620a, lead 742, a lead 834, switch 832, a lead 836, lead 732, the main driving motor 490, and lead 730. The main driving motor 490 is thus restarted after stopping for the time period during which the contact arm 664 has moved from the position 664a into the position in which its adjusted contact 678 engages contact 642a, and it is this time period which is added to the basic first developing time of the apparatus. The basic first developing time of the apparatus is the time period starting with the operation of the developer valve on closure of the developer switch 620e by the cam 632e' on the control disk 464, and ending with the first tilting of the tray 128 in the operating cycle into the drain-off position shown in dotted lines in Fig. 7 as caused by the raised portion 330' of the cam 330. It is, of course, during this time period that the timer operation is interjected, thus prolonging the basic first developing time. Since the above described holding circuit for the timer motor 672 is still closed when contact 642a is engaged by contact 678 on the arm 664, the latter will continue to turn until the contact 677 thereon rides off the track 652 and onto the insulating separator 660a into the position indicated by dot-and-dash line 664b in Figs. 20 and 30, thereby interrupting said holding circuit and stopping the timer motor 672.

After the restart of the main driving motor 490, the cam 632d' on the control disk 464 next actuates the water switch 620d which is in circuit with the solenoid 840 of the previously mentioned water valve (not shown). The circuit of the solenoid 840 comprises lead 724, stop switch 620a, lead 742, water switch 620d, and lead 806 (Fig. 30). At this time in the cycle the tray 128 is in the drain-off position shown in dotted lines in Fig. 7, and water is squirted on the plate therein through the orifices in the water-discharge pipe 292.

Next to actuate a switch 620 is the cam 632f which actuates the bleach switch 620f. The same is in circuit with the solenoid 842 of the previously mentioned bleach valve (not shown). The circuit of the solenoid 842 comprises lead 724, stop switch 620a, lead 142, switch 620f, solenoid 842, and lead 806 (Fig. 30). At the time the bleach valve is opened for the discharge of bleaching solution, the tray 128 is in the dot-and-dash line position of Fig. 7 so that the sensitized plate therein may receive and hold the discharged solution.

While the plate in the tray 128 is subjected to the action of the bleaching solution, the timer H is again set in operation due to the actuation of the timer switch 620c by the cam 632c'' on the control disk 464. The timer operation then is the same as the above-described first operation thereof, except that the contact arm 664 travels this time from the position indicated by the dot-and-dash line 664b to the position indicated by the dot-and-dash line 664c in Figs. 20 and 30. As before, the main driving motor 490 and the parts driven thereby are stopped when the timer H resumes its operation, and the main driving motor 490 restarts when the adjusted contact 678 on the arm 664 engages contact 644a of the second contact set 644. The duration of the intermittent stop of the main driving motor 490 constitutes the time added by the timer H to the basic bleaching time of the apparatus, as will be readily understood.

Next to actuate a switch 620 is the cam 632d'' which actuates the water valve 620d for the second application of rinsing water to the plate in the tray 128.

The cam 632g on the turning control disk 464 next actuates the clearing switch 620g which is in circuit with the solenoid 376 of the clearing valve 306 (Fig. 2). The circuit of the solenoid 376 comprises lead 724, stop switch 620a, lead 742, switch 620g, lead 839, solenoid 376, and lead 806 (Fig. 30). When the clearing valve 306 is thus opened, clearing solution is applied to the plate in the tray 128 which is then in the dot-and-dash line position shown in Fig. 7, so that the plate may hold the solution for some time and be subjected to its action.

While the plate in the tray 128 is subjected to the action of the clearing solution, the cam 632c''' actuates the timer switch 620c, causing thereby an intermittent stop of the main driving motor 490 and intermittent operation of the timer H. The contact arm 664 travels, during this intermittent operation of the timer H, from the position indicated by dot-and-dash line 664c to the position indicated by dot-and-dash line 664d in Figs. 20 and 30, but the main driving motor 490 is restarted when the contact 678 on the arm 664 engages contact 646a of the contact set 646, as will be readily understood. The duration of the intermittent stop just mentioned of the main driving motor 490 constitutes the time added by the timer H to the basic clearing time of the apparatus.

While the plate in the tray 128 is subjected to the action of the clearing solution, the contact strip 636 on the turning control disk 464 actuates the second exposure switch 620h which is in circuit with the second exposure bulb 320. The circuit of the second exposure bulb 320 comprises lead 724, stop switch 620a, lead 742, switch 620h, lead 786, bulb 320, and a lead 850 (Fig. 30). It appears from Fig. 28 that the contact strip 636 closes the second exposure switch 620h for a considerable length of time during which the second application of the developer and the last intermittent operation of the timer H take place.

The second application of the developer to the plate in the tray 128 occurs when the cam 632e'' (Fig. 28) actuates the developer switch 620e. While the plate in the tray 128 is thus subjected to the developer as well as to the light from the second exposure bulb 320, the cam 632c'''' on the turning control disk 464 actuates the timer switch 620c, causing thereby another intermittent stop of the main driving motor 490, and the last intermittent operation of the timer H during which the contact arm 664 travels from the position indicated by dot-and-dash line 664d into the home position 664a in Figs. 20 and 30. The duration of the intermittent stop just mentioned of the main driving motor 490 constitutes the time added by the time H to the basic second developer time of the apparatus.

Next to actuate a switch 620 is the contact strip 634 on the turning control disk 464, which actuates the water switch 620d for the final rinsing of the developed and re-developed plate in the tray 128. The operating cycle of the apparatus is concluded when the stop cam 632a on the control disk 464 actuates the stop switch 620a and thereby opens the main circuit for the motor 490, at which time the cam assembly M has passed through one complete revolution.

Evidently, the timer H may be set to add more or less time to the basic developing, bleaching and clearing periods of the apparatus, by adjusting the contact 678 on the arm 664 so as to cooperate with other contacts of the sets 642 to 648. In this way, uniformly good photographic results may be obtained with different kinds of sensitized paper, even though these require treatment of different duration by the various chemical solutions.

For certain types or grades of sensitized paper the basic developing, bleaching and clearing periods of the apparatus suffice, in which case the timer H is disconnected from the rest of the apparatus by throwing the control switch 818 into the dot-and-dash line position shown in Fig. 30. In that event, actuation of the timer switch 620c in an operating cycle of the apparatus by any of the cams 632c on the control disk 464 will not result in operation of the timer, since the switch 818 in the dot-and-dash line position (Fig. 30) keeps the main circuit of the timer motor 672 open. In the dot-and-dash line position of the switch 818 (Fig. 30) an auxiliary circuit for the main driving motor 490 is closed. This circuit comprises lead 730, the main driving motor 490, leads 732 and 836, switch 818, leads 834 and 742, stop switch 620a, and lead 724. This circuit is closed throughout an operating cycle of the apparatus, so that the main driving motor and the parts driven thereby never stop during the whole operating cycle.

The manual switch 808 (Fig. 30) will, when open, prevent the energization of the solenoids 804, 842, 376 and 840 of the developer, bleach, clearing and water valves, respectively, thereby affording the opportunity to run the apparatus through a test cycle for the repair, adjustment or inspection of a mechanism or mechanisms thereof, without the application of water and the various chemical solutions. The entire apparatus may also be rendered inoperative by opening a main control switch 852 (Fig. 30).

Provisions are also made to render the apparatus inoperative when all the magazines 76 on the turret are exhausted. To this end, there is provided in the main support 42 an aperture 860 (Figs. 6 and 14) through which extends a feeler element 862 on a blade 864 which normally yieldingly urges said element into the aperture 860. The feeler element 862 has a depending shank 866 which disengages a switch 868 on the main support 42 when said element bears against the bottom surface 61' of the turret 60 or the lowermost plate 50 in any magazine on the turret (Fig. 14). When in the course of an indexing operation of the turret 60 the magazine next to move into the plate-discharge position over the track 126 is exhausted, the feeler element 862 is free to enter this magazine when it passes, resulting in closure of the "empty" switch 868 which, as shown in Fig. 30, is in an "empty-magazine" circuit which comprises lead 872, empty switch 868, lead 874, a relay 870, and a lead 876. Energization of the relay 870 in consequence of the closure of this circuit causes movement of the movable contact 718 of switch 716 into engagement with the pole 878 thereof, causing thereby, after the termination of the present operating cycle of the apparatus, energization of an "empty" light 880 by way of leads 724 and 722, the closed switch 640, lead 720, switch 716, lead 882 and lead 768. The empty light 880 is mounted conspicuously on the cabinet so as to be readily discernible by the public when illuminated. Switch 716 is of the type remaining in the above-described position after its actuation by the relay 870, and requires manipulation by an operator for its return into the position shown in Fig. 30. This explains why the described "empty-magazine" circuit will be closed on closure of switch 640 at the very end of the present operating cycle of the apparatus, although the empty switch 868 is actuated only temporarily during the cycle and is open at the end of the cycle. It follows, therefore, that the empty light 880 will remain illuminated until the switch 716 is manually returned to the position shown in Fig. 30. This will be done by an operator who replaces the exhausted magazines 76 on the turret with loaded magazines. It follows further from the wiring diagram in Fig. 30 that the totalizer 530 (Fig. 24) will not be indexed on deposition of the correct coin or coins in the apparatus when all the magazines are exhausted and the empty light 880 is on, since the circuit through either one of the solonoids 580, 582 and 584 is interrupted when the switch 716 is in position to close the circuit through the empty light 880. Of course, any coin or coins deposited in the inoperative apparatus is returned to the depositor by simply pushing the button 614 (Fig. 27).

Provision is also made to reset the totalizer 530 when a depositor, after inserting into the apparatus a coin or coins of an insufficient amount to start an operating cycle thereof, decides to have the coin or coins returned by pressing the button 614. For instance, the depositor may insert two dimes into the apparatus and then find that he or she lacks a nickel to complete the deposit for an operating cycle. The depositor may, in that case, wisely decide to have the dimes returned to obtain additional change, rather than leave the dimes in the apparatus and lose them if someone else should in the meantime use the apparatus. Deposition of two dimes, for instance, in the apparatus causes the advance of the totalizer 530 through four fifths of its way into operative position, this advance of the totalizer constituting credit to the amount of 20¢. It is this credit which has to be cancelled when the two dimes are returned to the depositor, by resetting the totalizer 530. To this end, the switch 784 (Fig. 30) is so operatively connected with the push button 618 (Fig. 27)

that it is closed when the latter is depressed, closing thereby a circuit comprising lead 782 in which switch 784 is interposed, switch 770, lead 774, reset solenoid 562, and lead 772. Energization of the reset solenoid causes, of course, return of the totalizer 530 to zero position and, hence, cancellation of the credit in the apparatus for the dimes when they are returned to the depositor.

The timed relation of the operations of the various mechanisms and devices of the apparatus during one complete operating cycle of the latter is illustrated graphically in the time chart of Fig. 29. In this chart, the various operations are shown in relation to one complete revolution of the cam assembly M through 360°. The time chart is divided into several tiers which are identified by the numerals I to IX.

The line *a*—*b* in tier I represents the operation of the main driving motor 490 during a complete cycle. As shown, the operation of the main driving motor 490 is continuous if the timer H is not interjected, and is interrupted at the intersections of the line *a*—*b* with the dot-and-dash lines *c*, *d*, *e* and *f* when the timer H is interjected.

The line in tier II represents the actuation of the tray 128. At the start of an operating cycle of the apparatus and for some time thereafter, the tray 128 is in the full-line ejecting position shown in Fig. 7 as represented by the part *g*—*h* of the line in tier II of the chart. Thereafter, the tray 128 is rocked into the plate-receiving position shown in dot-and-dash lines in Fig. 7, as is represented by the portion *h*—*i* of the line in tier II of the chart. The tray 128 remains substantially in this position, except for agitation as hereinafter described, for the first application of developer to the plate in the tray. The tray 128 is thereafter tilted into the drain-off position shown in dotted lines in Fig. 7 and again returned to the receiving position for the application of the bleaching solution to the plate in the tray, as is represented by the portion *j*, *k*, *l* and *m* of the line in tier II. The tray 128 is thereafter tilted twice more into the drain-off position and returned to receiving position for the application of the clearing solution and the second application of the developer, respectively, the tilting of the tray in these instances being represented by the depressions *n* and *o* in the line in tier II of the time chart. Thereafter, the tray 128 is again tilted into the drain-off position as represented by the drop *p*—*q* in the line for the final wash of the plate in the tray with water. Thereupon, and just before the operating cycle of the apparatus is concluded, the tray is tilted into the plate-ejecting position, as represented by the drop *r*—*s* in the line, for the ejection of the developed plate from the tray and its delivery to the purchaser. While the tray is in the dot-and-dash line position (Fig. 7) during the time intervals when the plate therein is subjected to the various liquid chemicals, the tray is rocked slightly back and forth or agitated to accelerate the action of these chemicals on the plate. The tilter cam 330 is designed accordingly.

The abrupt rise *t* in the line in tier III represents the operation of the shutter of the camera of the apparatus.

The raised portion *u*—*v* of the line in tier IV represents the feed stroke of the slide 130 for the advance of the plates on the track 126.

The raised portion *w*—*x* of the line in tier V represents the first application of the developer, while the other raised portion *y*—*z* of the same line represents the second application of the developer.

The raised portions *a'*—*b'*, *c'*—*d'* and *e'*—*f'* of the line in tier VI represent the application of water to the plate in the tray 128.

The raised portion *g'*—*h'* of the line in tier VII represents the application of the bleaching solution.

The raised portion *i'*—*j'* of the line in tier VIII represents the application of the clearing solution, and the raised portion *k'*—*l'* of the line in tier IX represents the second exposure.

Having thus described our invention, what we claim and desire to secure by Letters Patent is:

1. In apparatus of the character described, a tiltable tray for supporting an exposed photographic plate for treatment with different liquids, a discharge chute for a treated plate below said tray, and a drain at one side of said chute for the waste liquids, said tray having a flow-off channel downwardly inclined to said drain and in drain-off relation with the latter in any position of said tray.

2. In apparatus of the character described, having a first station at which to expose a photographic plate and a second station at which to develop and re-develop an exposed plate, said stations being directly adjoining so that plates thereat are accordingly adjoining, the combination of a track in which a plate is edgewise movable successively into said stations, a slide movable in said track for moving a first plate therein into said first station, whereby a plate at the latter station is pushed by said first plate into said second station, a device for imparting to said slide a predetermined forward stroke to move said first plate into said first station, electrically operated means for actuating said device, and means interrupting the operation of said electrically operated means when said slide fails to reach the end of its forward stroke.

3. In apparatus of the character described, having a first station at which to expose a photographic plate and a second station at which to develop and re-develop an exposed plate, said stations being directly adjoining so that plates thereat are accordingly adjoining, the combination of a track in which a plate is edgewise movable successively into said stations, a slide movable in said track for moving a first plate therein into said first station, whereby a plate at the latter station is pushed by said first plate into said second station, a device for imparting to said slide a predetermined yielding forward stroke to move said first plate into said first station, electrically operated means for actuating said device, and means interrupting the operation of said electrically operated means when said slide fails to reach the end of its forward stroke.

4. In apparatus of the character described, having a first station at which to expose a photographic plate and a second station at which to develop and re-develop an exposed plate, said stations being directly adjoining so that plates thereat are accordingly adjoining, the combination of a track in which a plate is edgewise movable successively into said stations, reciprocable mechanism having a predetermined yielding forward stroke for moving a first plate in said track into said first station, whereby a plate at the latter station is pushed by said first plate into said second station, means including a rotary controller for reciprocating said mechanism, an electric motor for driving said controller, a main circuit for said motor including a first normally closed switch, a holding circuit for said motor including a second normally open switch, a cam on said controller opening said first switch when said mechanism is due to reach the end of its yielding stroke, and an element carried by said mechanism and closing said second switch when said mechanism is at the end of its forward stroke.

5. In apparatus of the character described, the combination of devices for subjecting an exposed photographic plate to different chemical solutions, respectively, stationary controllers operable to cause operation of said devices, respectively, a rotary member having elements for operating said controllers, respectively, in a certain sequence on rotation of said member, means including an electric motor for driving said member, a main circuit for said motor including one of the two fixed contacts and the movable contact of a first single-pole double-throw switch of which the movable contact is normally urged into engagement with said one fixed contact, a restart circuit for said motor including a normally open second switch, parts on said member for shifting the movable contact of said first switch into engagement with the other fixed contact thereof during subjection of a plate to said solutions, respectively, electric timing means operative after a predetermined period of operation thereof to close said second switch, and a third circuit for said timing means including said other fixed and movable contacts of said first switch.

6. The combination in apparatus as set forth in claim 5, in which said re-start circuit further includes a manually opened and closed switch in parallel with said second switch for rendering said timing means operative and inoperative.

7. The combination in apparatus as set forth in claim 5, further comprising a single pole double-throw switch having two pairs of spaced second contacts in said re-start and third circuits, respectively, and a contact blade manually shiftable into bridging engagement with either pair of second contacts.

8. The combination in apparatus as set forth in claim 5, in which said member makes one complete revolution during which said devices perform once in said certain sequence, said re-start circuit further comprises a manually opened and closed switch in parallel with said second switch for rendering said timing means operative and inoperative, and there are further provided a normally closed stop switch in said main circuit, and an additional element on said member for opening said stop switch at the end of each complete revolution of said member.

9. In apparatus of the character described, the combination of devices for subjecting an exposed photographic plate to different chemical solutions, respectively, stationary controllers operable to cause operation of said devices, respectively, a rotary member having elements for operating said controllers, respectively, in a certain sequence on rotation of said member, means including a first electric motor for driving said member, a main circuit for said motor including one of the two fixed contacts and the movable contact of a first single-pole double-throw switch of which the movable contact is normally urged into engagement with said one fixed contact, a re-start circuit for said motor including a normally open second switch, parts on said member for shifting the movable contact of said first switch into engagement with the other fixed contact thereof during subjection of a plate to said solutions, respectively, and a timer comprising a relay operative when energized to close said second switch, a rotary arm carrying a radially extending contact strip, a closed contact ring concentric with the rotary axis of said arm and arcuate contact tracks spaced from and arranged concentrically with said contact ring and spaced at their adjacent ends by gaps of greater width than that of said contact strip, second contacts spaced from said contact ring and tracks and arranged within the angular extent of said tracks, respectively, said contact strip extending in the common plane of said ring, tracks and second contacts so as to engage them during rotation of said arm, a timing motor for driving said arm, a third circuit for said timing motor including said other fixed and movable contacts of said first switch, separate circuits for said relay, said relay circuits including said second contacts, respectively, and said contact ring, and separate holding circuits for said timing motor, said holding circuits including said tracks, respectively, and said contact ring.

10. The combination in apparatus as set forth in claim 9, further comprising sets of said second contacts, said contact sets are arranged concentrically with the rotary axis of said arm and spaced radially from each other, the contacts of said sets are arranged in groups of which each group is associated with a contact track and composed by one contact of each set, and the contacts of each group are arranged within the angular extent, and spaced longitudinally, of the associated contact track, said relay circuits include the contacts of said sets, respectively, and said contact ring, said contact strip is adjacent said second contacts parallel to, but spaced from, the common plane of the latter, and there is further provided a contact slidable on said contact strip longitudinally thereof and extending to the common plane of said second contacts so as to be engageable during rotation of said arm with the contacts of either set with which said slidable contact is aligned.

11. The combination in apparatus as set forth in claim 9, in which said re-start circuit further includes a manually opened and closed switch in parallel with said second switch for rendering said timer operative and inoperative.

12. In apparatus of the character described, devices for treating an exposed photographic plate with different chemical solutions, respectively, mechanism having an operating cycle and including a rotary controller power-driven at a certain speed for operating said devices for certain basic treatment periods, respectively, and in timed relation with each other during a cycle for the treatment of a plate, and an instrumentality settable prior to an operating cycle of said mechanism and operatively connected with the latter, said instrumentality being rendered operative by said mechanism during a cycle thereof to stop said controller during a basic treatment period for a pre-determined time interval so as to prolong said basic treatment period accordingly.

13. In apparatus of the character described, devices for treating an exposed photographic plate with different materials, respectively, mechanism having an operating cycle and including a rotary controller power-driven at a certain speed for operating said devices for certain basic treatment periods, respectively, and in timed relation with each other during a cycle for the treatment of a plate, an instrumentality for intermittently stopping said controller during a basic treatment period of said mechanism for a pre-determined time interval so as to prolong said basic treatment period accordingly, and operating means for said instrumentality, said operating means being rendered operative by said mechanism during a cycle thereof.

14. In apparatus of the character described, devices for treating an exposed photographic plate with different materials, respectively, mechanism having an operating cycle and including a rotary controller for operating said devices in a predetermined sequence for certain basic treatment periods, respectively, for the treatment of a plate, means including an electric motor for driving said controller, a main circuit for said motor including a first switch having first and second positions and closing said circuit when in said first position, a re-start circuit for said motor including a normally open second switch, said controller operating said first switch into said second position thereof during a cycle, timing means operative after a predetermined period of operation thereof to close said second switch, and a third circuit for said timing means including said first switch, said third circuit being closed by said first switch in said second position thereof.

15. The combination in apparatus as set forth in claim 14, further comprising switch means in parallel with said second switch and operable to selectively render said timing means operative and inoperative.

16. The combination in apparatus as set forth in claim 14, further comprising switch means in parallel with said second switch and operable to selectively render said timing means operative and inoperative, and an auxiliary circuit for said motor including said switch means, said auxiliary circuit being closed when said switch means is operated to render said timing means inoperative.

17. The combination in apparatus as set forth in claim 14, in which said controller makes one complete revolution during which said devices perform once in said predetermined sequence, said re-start circuit further comprising switch means in parallel with said second switch and operable to selectively render said timing means operative and inoperative, and a normally closed stop switch in said main circuit, said controller opening said stop switch at the end of each complete revolution thereof.

WILLIAM RABKIN.
ALEXANDER LISSIANSKY.
ANDREW SEBESTYEN.

REFERENCES CITED

The following references are of record in the file of this patent:

UNITED STATES PATENTS

| Number | Name | Date |
|---|---|---|
| 478,780 | Bristol | July 12, 1892 |
| 1,680,709 | Swanberg | Aug. 14, 1928 |
| 1,768,501 | Beidler | June 24, 1930 |
| 1,809,690 | Gregory | June 9, 1931 |
| 1,816,290 | Klimis | July 28, 1931 |
| 1,862,190 | McCowan | June 7, 1932 |
| 1,985,554 | Smith | Dec. 25, 1934 |
| 2,124,106 | Dye | July 19, 1938 |
| 2,192,755 | Rabkin | Mar. 5, 1940 |
| 2,428,681 | Pratt | Oct. 7, 1947 |